(12) United States Patent
Lee et al.

(10) Patent No.: US 6,977,274 B2
(45) Date of Patent: Dec. 20, 2005

(54) EPOXY RESIN CURING SYSTEM CONTAINING LATENT CATALYTIC CURING AGENT CAUSING THE EXPANSION OF VOLUME

(75) Inventors: Jae-Rock Lee, Daejeon (KR); Soo-Jin Park, Daejeon (KR); Geun Ho Kwak, Daejeon (KR)

(73) Assignee: Korea Research Institute of Chemical Technology, Daejon (KR)

( * ) Notice: Subject to any disclaimer, the term of this patent is extended or adjusted under 35 U.S.C. 154(b) by 0 days.

(21) Appl. No.: 09/493,765

(22) Filed: Jan. 28, 2000

(65) Prior Publication Data

US 2003/0073801 A1 Apr. 17, 2003

(30) Foreign Application Priority Data

Jan. 30, 1999 (KR) .......................................... 1999-3021
Jul. 3, 1999 (KR) ........................................ 1999-26779

(51) Int. Cl.[7] ............................ C08F 2/46; C08G 59/68
(52) U.S. Cl. ........................... 522/31; 522/170; 528/92; 528/93; 528/118; 523/421; 525/526
(58) Field of Search ........................... 528/92, 93, 118; 523/421; 522/170, 31; 525/526

(56) References Cited

U.S. PATENT DOCUMENTS

| | | | |
|---|---|---|---|
| 3,294,865 A | | 12/1966 | Price |
| 3,879,312 A | * | 4/1975 | Udding et al. ............. 528/92 X |
| 4,069,055 A | * | 1/1978 | Crivello ..................... 528/92 X |
| 4,246,298 A | | 1/1981 | Guarnery et al. ............. 427/46 |
| 4,393,185 A | | 7/1983 | Berner et al. ................. 528/27 |
| 4,694,029 A | | 9/1987 | Land ............................. 522/8 |
| RE32,628 E | * | 3/1988 | Tesch et al. ............ 528/118 X |
| 4,756,787 A | * | 7/1988 | Drain et al. .............. 528/92 X |
| 4,962,162 A | | 10/1990 | Kosuda et al. .............. 525/422 |
| 5,070,161 A | * | 12/1991 | Nakano et al. ........... 528/92 X |
| 5,169,473 A | | 12/1992 | Bertram et al. .......... 156/307.4 |
| 5,317,068 A | * | 5/1994 | Watanabe et al. ........... 525/526 |
| 5,459,266 A | | 10/1995 | Kvakovszky et al. ....... 544/336 |
| 5,541,000 A | | 7/1996 | Hardy et al. .............. 528/93 X |
| 6,034,200 A | | 3/2000 | Lee et al. ...................... 528/94 |
| 6,121,405 A | | 9/2000 | Lee et al. ...................... 528/92 |
| 6,133,383 A | | 10/2000 | Lee et al. .................... 525/504 |
| 6,376,638 B1 | * | 4/2002 | Lee et al. ............... 522/170 X |

FOREIGN PATENT DOCUMENTS

| | | |
|---|---|---|
| JP | 6-2288414 | 8/1994 |
| JP | 06-321915 | 11/1994 |
| JP | 10-182797 | 7/1998 |
| JP | 10-195180 | 7/1998 |
| JP | 11-029623 | 9/1998 |

OTHER PUBLICATIONS

U.S. Appl. No. 08/959,401, filed Oct. 28, 1997, Lee et al.
U.S. Appl. No. 08/959,889, filed Oct. 29, 1997, Lee et al.

(Continued)

Primary Examiner—Daniel S. Metzmaier
(74) Attorney, Agent, or Firm—Ladas & Parry LLP

(57) ABSTRACT

The present invention relates to a novel epoxy resin curing system comprising a cationic latent catalytic curing agent containing a hexafluoroantimonate, characterized by exhibiting no shrinkage of volume or inducing an expansion of volume during the curing reaction of the epoxy resin. By the use of the epoxy resin curing system comprising a cationic latent catalytic curing agent containing a hexafluoroantimonate, it is possible to inhibit the shrinkage of volume or to induce the expansion of volume during the curing reaction of the epoxy resin. The development of such curing systems made it possible to improve the dimensional stability and to remove the residual stress, which has caused problems for decades in the production of various molded articles. Furthermore, the curing systems according to the present invention have excellent adhesive properties, thereby making it possible to develop adhesives for accurate spatial infiltration.

17 Claims, 11 Drawing Sheets

OTHER PUBLICATIONS

U.S. Appl. No. 09/430,368, filed Oct. 28, 1999, Lee et al.

Kim, Y.C., et al., "Effects of N–Benzylpyrazinium Hexafluoroantimonate Concentration on Rheological Properties in Cationic Epoxy Cure System," *Polymer Journal*, vol. 29, No. 9 (Mar. 17, 1997) pp. 759–765.

Doyle, C.D., "Estimating Thermal Stability of Experimental Polymers by Empirical Thermogravimetric Analysis," *Analytical Chemistry*, vol. 33, No. 1 (Jan. 1961) pp. 77–79.

English language translation of Korean Patent Application No. 1996–49371, which was filed on Oct. 29, 1996; published on Apr. 29, 1998; and entitled "Method for Preparing a High Heat Resistant Epoxy Resin Composition Comprising Quinoxalinium Salt Containing Benzyl Group" (21 total pages, including 3 pages of cover sheets).

English language translation of Korean Patent Application No. 1996–51719, which was filed on Oct. 30, 1996; published on Apr. 30, 1998; and entitled "Method for Preparing a High Heat Resistant Epoxy Resin Composition Comprising Pyrazinium Salt Containing Benzyl Group" (18 total pages, including 3 pages of cover sheets).

* cited by examiner

EPOXY RESIN CURING SYSTEM CONTAINING LATENT CATALYTIC CURING AGENT CAUSING THE EXPANSION OF VOLUME

BACKGROUND OF THE INVENTION

1. Field of Invention

The present invention relates to a novel epoxy resin curing system which comprises of a cationic latent catalytic curing agent containing a hexafluoroantimonate, which is designed to cause an expansion of volume at the time of curing reaction. It also relates to an epoxy resin cured product obtainable by curing said epoxy resin curing system and to a method for the production of the epoxy resin cured product.

2. Background of Invention

The conventional thermosetting resins are accompanied by a shrinkage of volume of approximately 3% to 15% on curing. Such a shrinkage of volume may lead to many problems. For example: it deteriorates the dimensional stability of the cured products; it deteriorates the attachment between the substrate and the medium and thus, it leads to the occurrence of pores (formed from remaining air bubbles) or microcracks when manufacturing an elaborate adhesive and a composite matrix having good physical properties. In order to avoid the shrinkage of the cured products, fillers were utilized at the initial stage, but their use has resulted in many problems including damage to the surface of the mold.

Thereafter, spiro-ortho compounds, which do not exhibit a shrinkage of volume or show a little expansion of volume at the time of polymerization (polymerization aimed at curing), have been introduced. However, the spiro-ortho compounds also have problems in that the process for synthesizing the compounds is very complex. In addition, the applicability of the epoxy resin cured products obtained by copolymerizing the epoxy resin and a spiro-ortho compound used in the curing reaction has been restricted since their glass transition temperatures are very low, which in turn causes residual stress. These spiro-ortho compounds may exhibit approximately 25% of volume expansion when they are heated. However, when they are mixed with an epoxy resin, it is impossible to effectively suppress the shrinkage of volume owing to the curing reaction of the epoxy resin since an expansion of volume arises in addition to the curing reaction of the epoxy resin. As a result, it has been difficult to acquire the balance between physical properties in the entire curing systems and cured products obtained by the curing of the said curing systems. Accordingly, such expandable resins have inferior applicability when employed as structural materials requiring the balance between the entire mechanical properties. Generally, the term "curing systems" refers to the reaction systems which contain resins such as thermosetting resins and are introduced in a curing reaction by heat and the like.

SUMMARY OF THE INVENTION

It is, therefore, an objective of the present invention to develop a curing system comprising a catalyst (namely, curing agent) which possesses the following advantages:

the curing agent is able to overcome the associated problems of conventional bulky fillers and the conspiro-ortho mixture of which mechanical physical properties are inferior owing to its low glass transition temperature and the occurrence of inhomogeneiety in the entire system;

the curing agent is easy to synthesize;

the curing agent exhibits a relatively high glass transition temperature; and various energy sources including heat and UV light can be employed to the curing agent.

Accordingly, it is possible to develop a curing system which is capable of solving the problems associated with the process procedure and is excellent in its activity and storage stability. The main objective of the present invention is to develop a curing system of new functions and applicability, which can provide high value-added molded articles applicable in the advanced and accurate industries, for example, a molded product in which no residual stress remains and a high level of dimensional stability is observed; a filler for dental use which does not cause the shrinkage of volume; an elaborate adhesive with high strength; a matrix for composite materials of which physical properties are good owing to the removal of the cause of microcracks; and aerospace materials.

The other objectives and features of the present invention will become apparent to those skilled in the art on review of the following detailed description. It should be understood, however, that the detailed description and specific examples, whilst indicating preferred embodiments of the present invention, are given by way only of illustration and not limitation. Many changes and modifications within the scope of the present invention may be made without departing from the spirit thereof, and the invention includes all such modifications.

DETAILED DESCRIPTION

Figure 1:
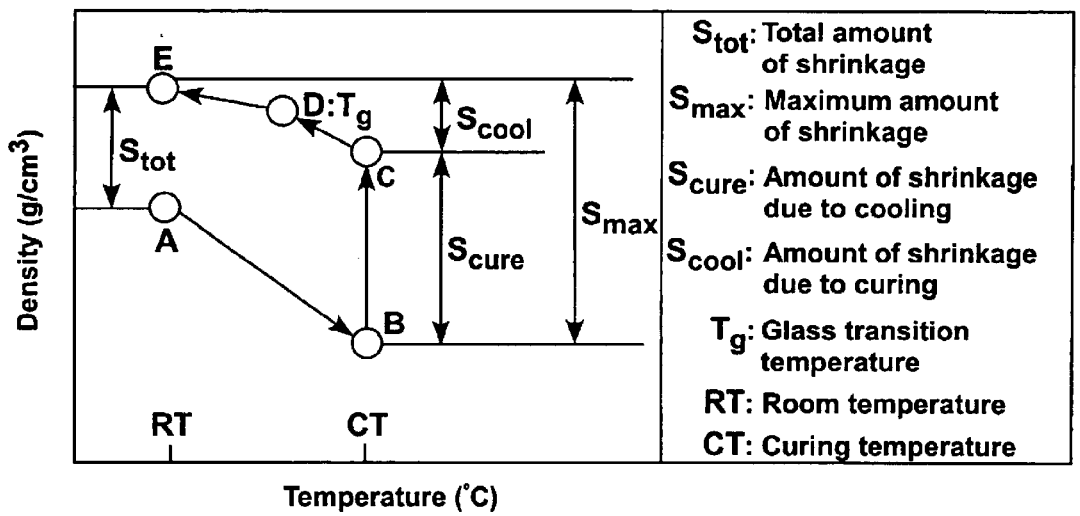
FIG. 1 illustrates the variations of density of the curing system according to the shrinkage of volume when the curing reaction proceeds.

The present invention provides an epoxy resin curing system which comprises a cationic latent catalytic curing agent containing a hexafluoroantimonate, characterized by having no shrinkage of volume or inducing an expansion of volume during the curing of the epoxy resin.

The epoxy resin curing system of the present invention is characterized by the fact that the cationic latent catalytic curing agent containing a hexafluoroantimonate is at least one compound represented by formula (1) selected from the group consisting of the following compounds:

[Formula 1]

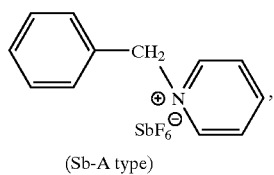

(Sb-A type)

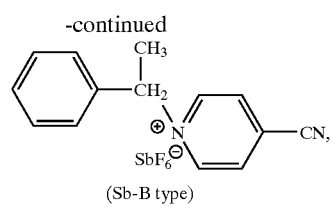

(Sb-B type)

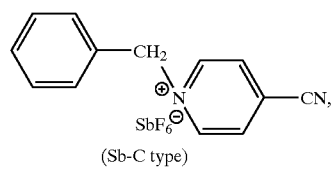

(Sb-C type)

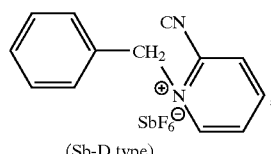

(Sb-D type)

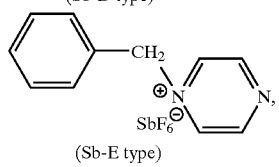

(Sb-E type)

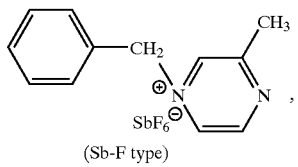

(Sb-F type)

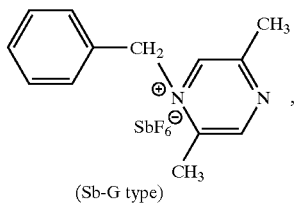

(Sb-G type)

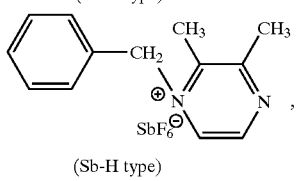

(Sb-H type)

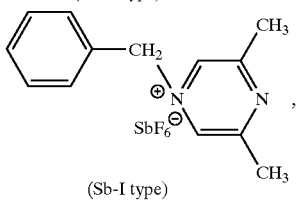

(Sb-I type)

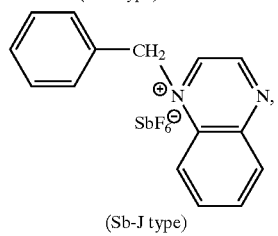

(Sb-J type)

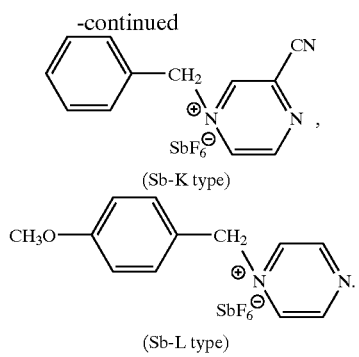

(Sb-K type)

(Sb-L type)

The epoxy resin curing system of the present invention is characterized by the fact that the cationic latent catalytic curing agent containing a hexafluoroantimonate is used in the amount mentioned below, depending on the kinds of the curing agent:

Sb-A: 0.00001 to 25% by weight; Sb-B: 0.00001 to 20% by weight;

Sb-C: 0.00001 to 25% by weight; Sb-D: 0.00001 to 15% by weight;

Sb-E: 0.00001 to 30% by weight; Sb-F: 0.00001 to 35% by weight;

Sb-G: 0.00001 to 30% by weight; Sb-H: 0.00001 to 30% by weight;

Sb-I: 0.00001 to 25% by weight; Sb-J: 0.00001 to 20% by weight;

Sb-K: 0.00001 to 35% by weight; Sb-L: 0.00001 to 20% by weight.

The epoxy resin used in the epoxy resin curing system according to the present invention is at least one resin selected from the group consisting of cycloaliphatic resins, aromatic difunctional resins, aromatic trifunctional resins and aromatic tetrafunctional resins.

The cationic latent catalytic curing agent containing a hexafluroantimonate used in the epoxy resin curing system of the present invention can give rise to a curing reaction by means of heat or light.

Said light aimed at the curing of the epoxy resin curing system of the present invention means at least one selected from the group consisting of UV-light, a high-frequency wave, a microwave, an electron beam, X-ray and γ-ray.

The epoxy resin cured products according to the present invention can be obtained by the curing treatment of the epoxy resin curing system as discussed above.

The method for the production of the epoxy resin cured product of the present invention can be carried out via heat curing by sequentially increasing the temperature from 120° C. to 180° C. at a rate of 3 to 7° C./minute.

The method for production of the epoxy resin cured product of the present invention can also be carried out via light curing by using a mold made of a transparent material allowing the transmission of light, maintaining the distance between the source of light and the curing system between 10 cm and 15 cm, and irradiating light onto both the front area and the back area of the curing system, thereby giving a cured product of which thickness is approximately 3 mm or more.

The epoxy resin cured product of the present invention can be obtained by thermal curing of the epoxy resin curing system of the present invention wherein the cationic latent catalytic curing agent containing a hexafluoroantimonate is contained in an amount of 1 to 5% by weight.

The present invention provides an epoxy resin curing system which comprises a cationic latent catalytic curing agent containing a hexafluoroantimonate, characterized by having no shrinkage of volume or inducing an expansion of volume without any use of separate fillers or additives during the curing of the epoxy resin.

The term "epoxy resin curing system" used in the present invention refers to a curable composition of epoxy resin comprising an epoxy resin and a cationic latent catalytic curing agent containing a hexafluoroantimonate (hereinafter referred to as "curing agent"). Namely, it indicates an epoxy resin (epoxy resin of low molecular weight) containing said curing agent and being used in the curing reaction. In addition, said epoxy resin may contain at least one or two epoxides or comonomers copolymerizable with said epoxides. The content of the comonomers is not specifically limited. It is also possible for said epoxy resin curing system to contain epoxide (monomer) or various additives, if necessary.

The present invention has been accomplished on the basis of the unexpected finding that the shrinkage of volume, which was inevitable in conventional thermosetting resins, is not observed or in contrast, an expansion of volume is observed if the epoxy resin curing system consisting of said cationic latent catalytic curing agent which contains a hexafluoroantimonate is cured. The fact that no shrinkage of volume is observed or in contrast an expansion of volume is observed during the curing reaction of the epoxy resin curing system has not been reported yet, the identification of such fact is therefore one of the features of the present invention.

The catalytic curing agent of a new conception having both high functional properties and also the epoxy resin curing system containing the same are characterized by the facts that they have a high storage stability and a high selectivity for exterior energy source such as heat and UV-light. In addition, the epoxy resin curing system of the present invention provides cured products whose mechanical properties are much better in comparison to those of cured products obtained by the use of conventional curing systems.

The epoxy resin used in the present invention is at least one resin selected from the group consisting of cycloaliphatic resins, aromatic difunctional resins, aromatic trifunctional resins and aromatic tetrafunctional resins, however it is not specifically limited thereto.

The cationic latent catalytic curing agent containing a hexafluoroantimonate is preferably at least one compound represented by formula (1) selected from the group consisting of the following compounds:

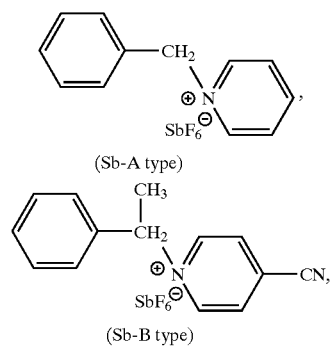

(Sb-A type)

(Sb-B type)

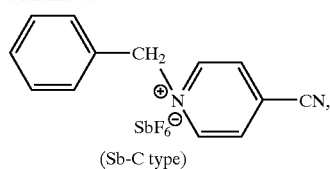
(Sb-C type)

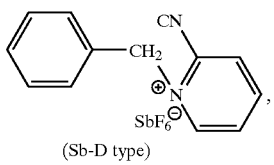
(Sb-D type)

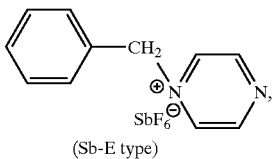
(Sb-E type)

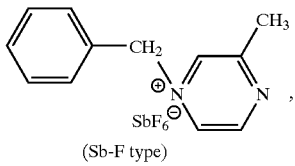
(Sb-F type)

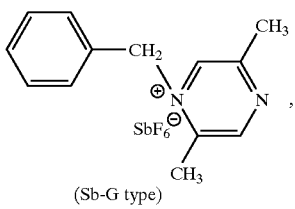
(Sb-G type)

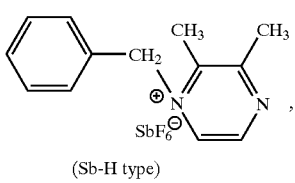
(Sb-H type)

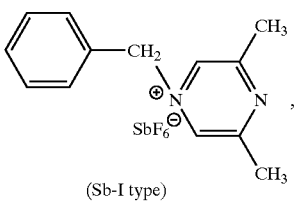
(Sb-I type)

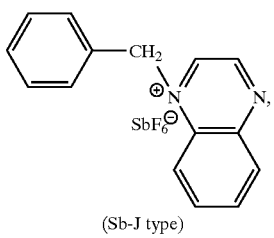
(Sb-J type)

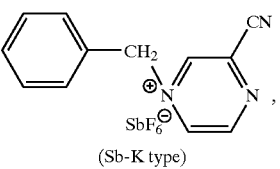
(Sb-K type)

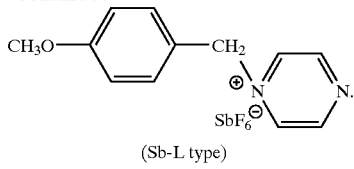
(Sb-L type)

The content of the cationic latent catalytic curing agent containing a hexafluoroantimonate of the above formula (1) in the epoxy resin curing systems, in order that they do not exhibit a shrinkage of volume or cause an expansion of volume when they are cured, is as follows:

Sb-A: 0.00001 to 25% by weight; Sb-B: 0.00001 to 20% by weight;

Sb-C: 0.00001 to 25% by weight; Sb-D: 0.00001 to 15% by weight;

Sb-E: 0.00001 to 30% by weight; Sb-F: 0.00001 to 35% by weight;

Sb-G: 0.00001 to 30% by weight; Sb-H: 0.00001 to 30% by weight;

Sb-I: 0.00001 to 25% by weight; Sb-J: 0.00001 to 20% by weight;

Sb-K: 0.00001 to 35% by weight; Sb-L: 0.00001 to 20% by weight.

The epoxy resin curing system comprising a cationic latent catalytic curing agent containing a hexafluroantimonate is particularly preferred in view of the fact that curing products may be simply obtainable via curing reactions by the employment of heat or light.

Said light means UV-light; a high-frequency wave in wavelength between 10 nm to 400 nm; a microwave; an electron beam; X-ray or γ-ray. The curing reaction may be carried out by irradiating ultrasonic wave. The wavelength of ultrasonic wave is not specifically limited, however preferred is an ultrasonic wave of 20 kHz.

When a system is cured by heat, the shrinkage of the curing system may be prevented effectively if the curing reaction is carried out by sequentially increasing the temperature from 120° C. to 180° C. at a rate of 3 to 7° C./minute.

When a system is cured by light, a mold is made of a transparent material allowing the transmission of light, and the distance between the source of light and the curing system is maintained between 10 cm and 15 cm. By the irradiation of light to both the front area and the back area of the curing system, a cured product of which thickness is approximately 3 mm or more can be obtained.

In the cases where the curing system is cured by the application of heat or light, the cured products of which both methanol absorptivity and water absorptivity are low and the dimensional stability is high can be obtained by the curing reaction of the curing system containing 1 to 5% by weight of the curing agent.

The present invention also relates to a cured epoxy resin product obtained by the curing of the epoxy resin curing system of the present invention by the employment of heat or light.

Generally, the shrinkage of volume in the resin (curing system) occurring in the course of curing reaction is caused by the change in an intermolecular distance from a van der Waals's distance (3 to 5 Å) to a covalent bonding distance (1 to 2 Å). In particular, the removal of the small molecules including water in the form of byproducts during the condensation polymerization also leads to a decrease in the volume of the resulting polymer.

When the polymerization reaction is complete, the polymerized product is cooled from high curing temperatures (CT) to room temperature (RT) (see: C~D~E in FIG. 1), causing heat shrinkage as shown in FIG. 1. In particular, it is known that the heat shrinkage (See: D~E in FIG. 1) occurred in the temperature range between a glass transition temperature ($T_g$) and room temperature (RT) exerts significant effect on the properties of materials obtained. This is because at a temperature higher than the glass transition temperature, the presence of flowability of the molecule is able to alleviate the volume change or stress observed in the produced materials, whereas at a temperature not more than the glass transition temperature, the decrease in flowability of the molecule due to the glassy state is not able to contribute to the behavior of stress relaxation.

Figure 2:
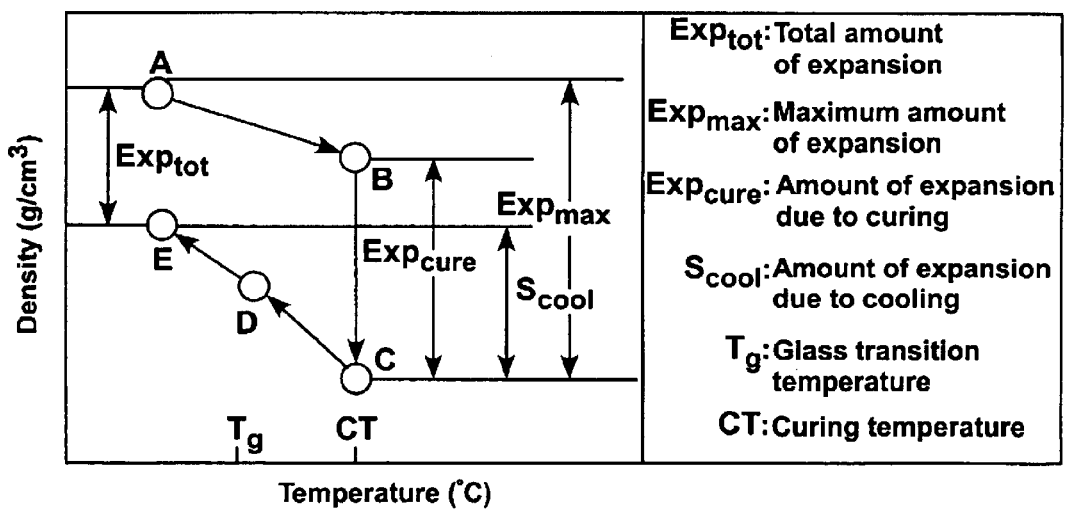
FIG. 2 illustrates the variations of density of another curing system according to the expansion of volume when the curing reaction proceeds.
Figure 3:
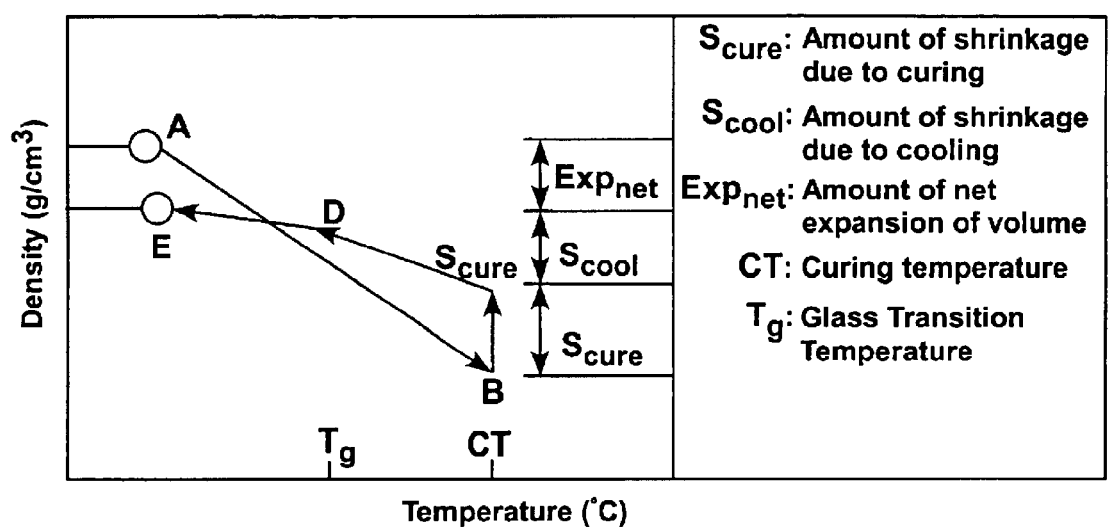
FIG. 3 illustrates the variations of density of another curing system according to the expansion of volume when the curing reaction proceeds.

Accordingly, in order to decrease the shrinkage of volume or induce an expansion of volume during the polymerization (namely, at the time of curing reaction of the curing system), the following two methods may be proposed:

The first method is to promote the expansion of volume (See: A~B in FIG. 3) at the time of polymerization as shown in FIG. 3 to overcome the shrinkage of volume owing to the difference in the heat expansion coefficients between polymer of low molecular weight before curing and polymer of high molecular weight after curing. The difference in the heat expansion coefficients between monomer of low molecular weight before curing and polymer of high molecular weight may also be adopted. The second method is to promote the expansion of volume by the avoidance of the shrinkage of volume owing to the difference between heat expansion coefficient during the isothermal polymerization as shown in FIG. 2 (B~C), where the heat expansion coefficient of the polymer of high molecular weight after curing is far lower than that of the monomer of low molecular weight before curing.

The epoxy resin curing system passes through a ring opening polymerization of the epoxide ring, and thus exhibits relatively small shrinkages of volume in comparison to the polycondensation-type curing system which accompanies the production of byproducts such as water formed after polymerization. However, such a shrinkage of volume may lead to the formation of microcracks or an abrupt breakdown of the products on a larger scale due to the accumulation of residual stress therein.

However, as illustrated in the following scheme, it can be observed that the covalent bonding in the epoxy resin curing system, which uses the latent catalytic curing agent according to the present invention, is broken by the ring opening of the epoxide ring and, thus converted to a three dimensional network structure, where a large number of linear chain structures, very similar to van der Waals bonding, are formed. Simultaneously, owing to the presence of the hydrogen bonding, the three dimensional network structures are doubly formed. In other words, the three dimensional network structures are bonded via hydrogen bonding to form further complex structures. The expansion of volume is considered to occur by the formation of a very complex and amorphous bonding structure during the formation of said multiple network structure, which increases the free volume of molecules formed by the thermal behavior and the stereo effect thereof. The presence of such ring opening reactions or hydrogen bonding is confirmed by the peak analysis of FT-IR, and the results thereof are shown in the following examples:

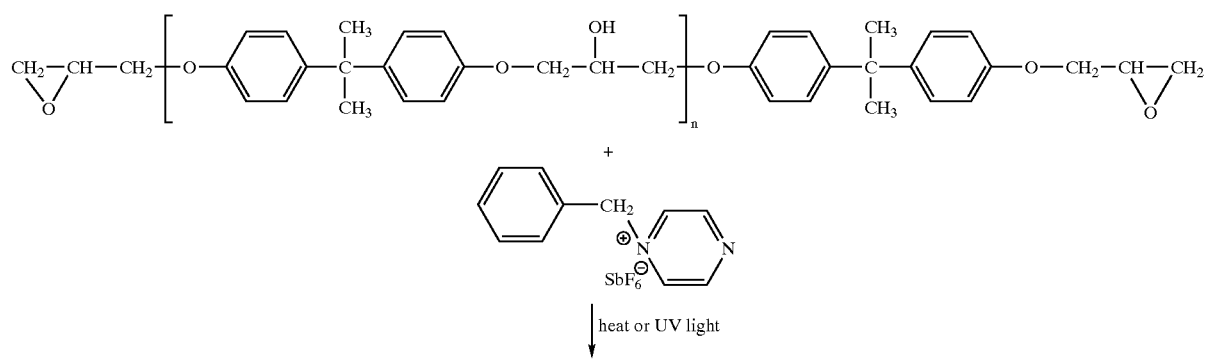

(1) Initiation Reaction

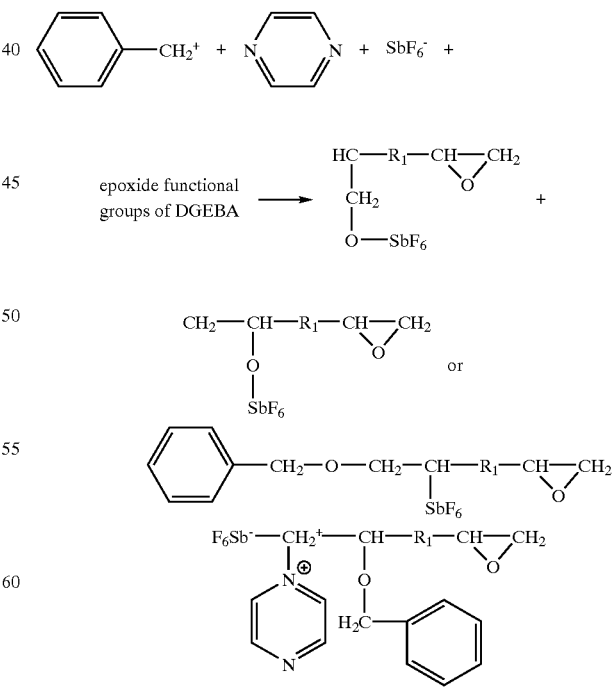

(The first possible hydrogen bonding)

(2) Initiation Reaction

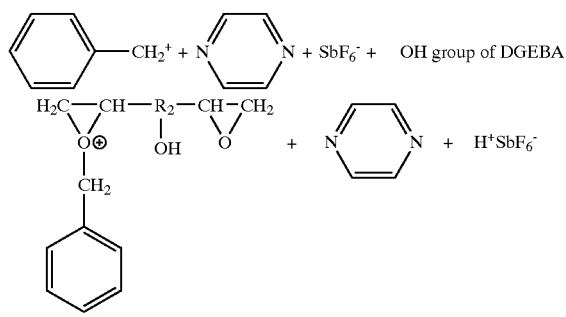

(3) Network Formation Reaction

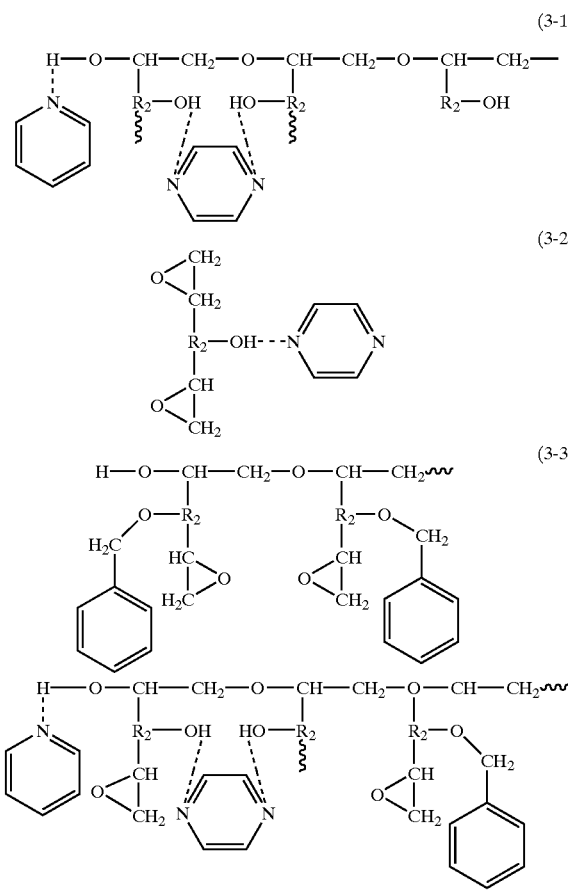

(Continuous hydrogen bonding formation)

wherein $R_1 = R_2$—OH, and

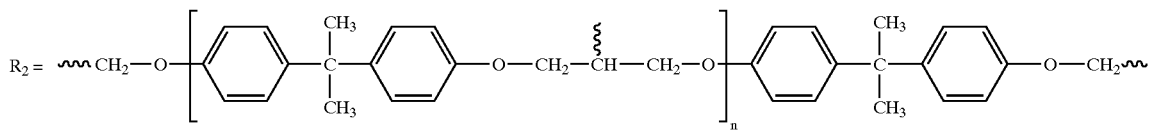

(n = 0.12 – 0.15)

The present inventors measured the density change of the epoxy monomer and polymer in order to determine the shrinkage or expansion of the epoxy monomer and polymer in the production of the epoxy resin cured products (resin after curing reaction) by curing the epoxy resin of low molecular weight. The density is defined as the size of mass per unit volume and is represented by $g/cm^3$ or $lb/in^3$. By measuring density before and after the curing reaction, it can be confirmed whether or not either a shrinkage or an expansion of volume has occurred. As shown in Tables 1 to 26 below, it is confirmed that the epoxy resin curing systems according to the present invention show no shrinkage of volume (even if shrinkage occurs, the rate of shrinkage was extremely small) or show expansion of volume as a result of the density change before and after the curing reaction by the use of various latent catalysts.

Figure 4:
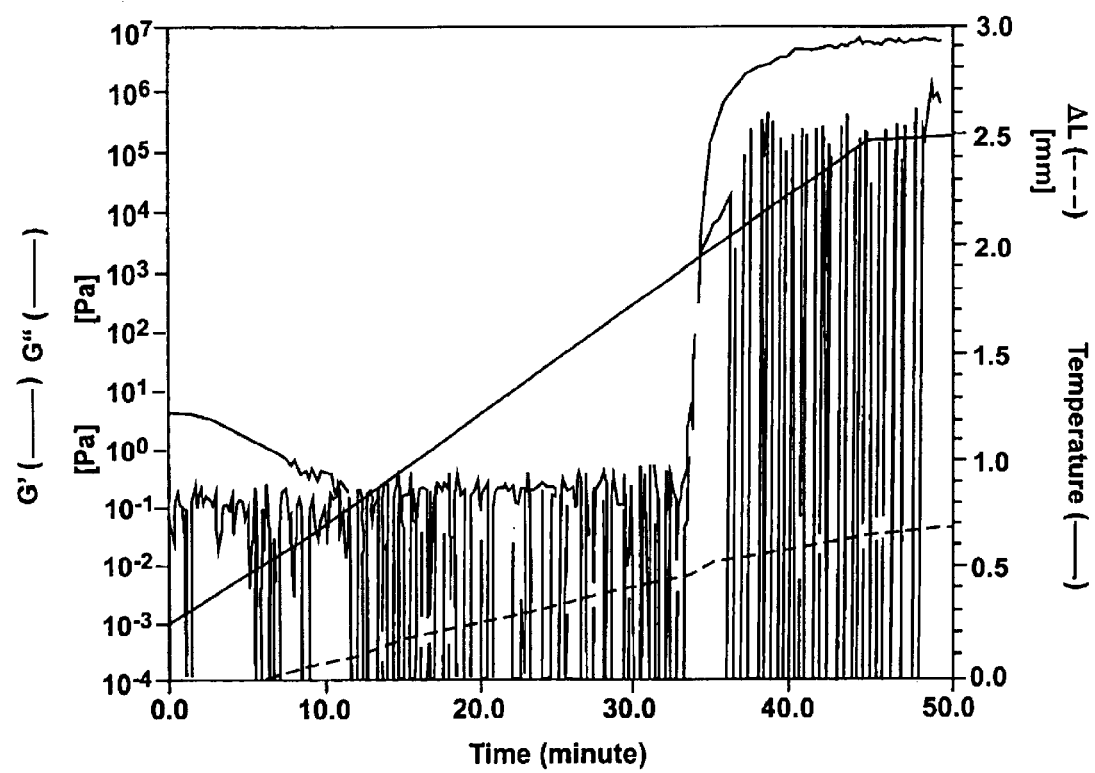
FIG. 4 illustrates the flow chart of the RDA experiment's results of the epoxy resin curing system (a difunctional epoxy resin+a Sb-A type curing agent) according to the present invention.
Figure 5:
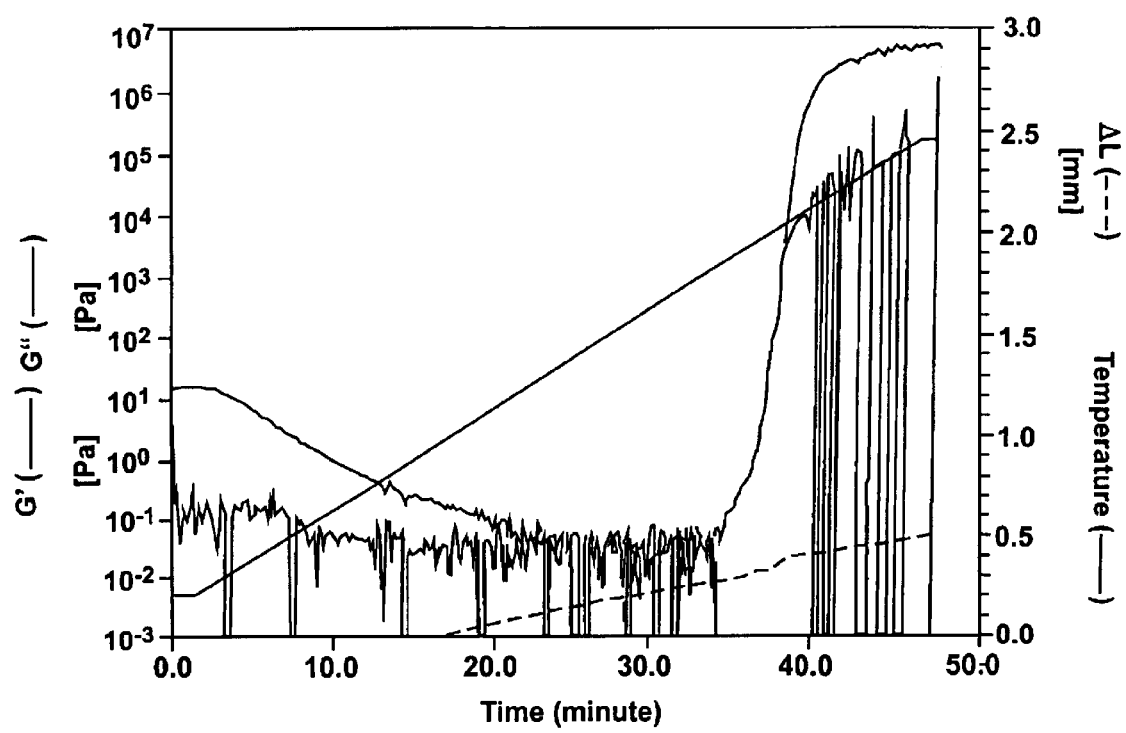
FIG. 5 illustrates the flow chart of the RDA experiment's results of the epoxy resin curing system (a difunctional epoxy resin+a Sb-B type curing agent) according to the present invention.
Figure 6:
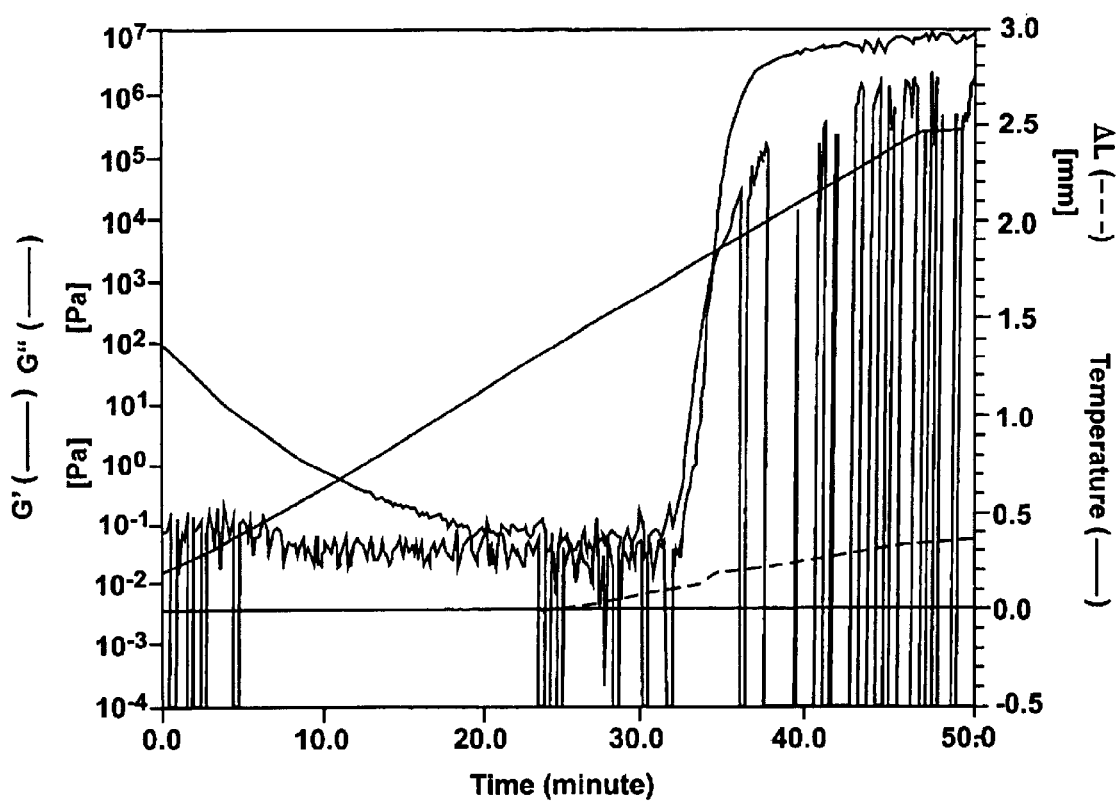
FIG. 6 illustrates the flow chart of the RDA experiment's results of the epoxy resin curing system (a trifunctional epoxy resin+a Sb-C type curing agent) according to the present invention.
Figure 7:
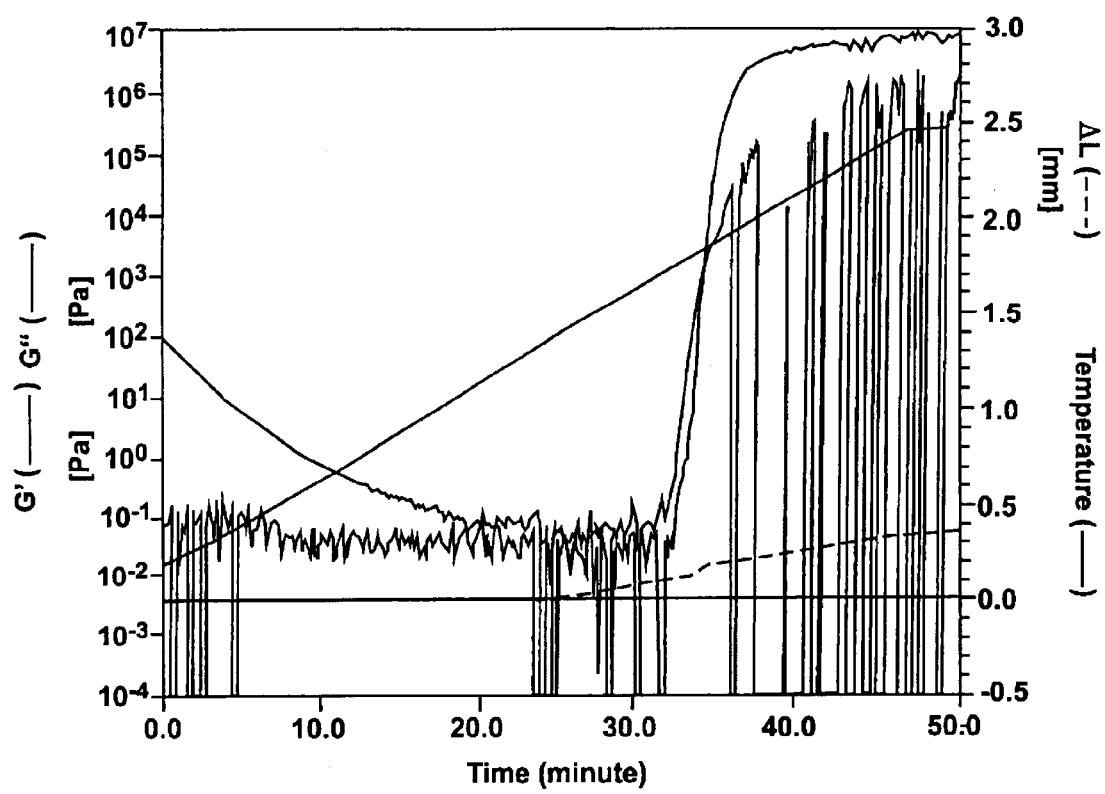
FIG. 7 illustrates the flow chart of the RDA experiment's results of the epoxy resin curing system (a tetrafunctional epoxy resin+a Sb-D type curing agent) according to the present invention.

It should be noted that the light cured products, for example UV cured products, demonstrate much higher expansion properties in comparison to heat-cured products. FIGS. 4 to 7 illustrate the RDA data of the epoxy resin curing systems containing various latent catalytic curing agents. More particularly, FIG. 4 illustrates the RDA data of the epoxy resin curing system containing a difunctional epoxy resin YD-128 and a Sb-A type curing agent. FIG. 5 illustrates the RDA data of the epoxy resin curing system containing a difunctional epoxy resin YD-128 and a Sb-B type curing agent. FIG. 6 illustrates the RDA data of the epoxy resin curing system containing a trifunctional epoxy resin Tactix 742 to be explained below and a Sb-C type curing agent. FIG. 7 illustrates the RDA data of the epoxy resin curing system containing a tetrafunctional epoxy resin MY 720 to be explained below and a Sb-D type curing agent.

It was found that the gap size increasement, $\Delta L$, represented by broken line at the bottom of the figures, showed a tendency to increase as time passed by, which also proves that the expansion of volume proceeded during the curing reaction.

Figure 8:
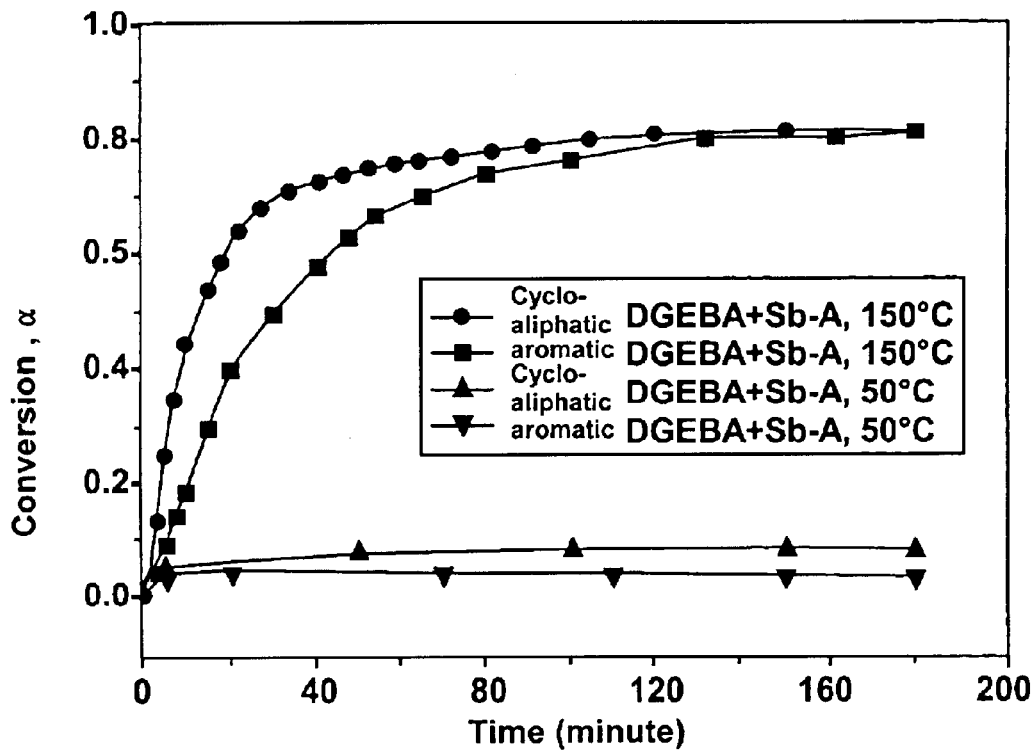
FIG. 8 illustrates the relationship between time and conversion when the epoxy resin curing systems (a di-functional epoxy resin+a Sb-A type curing agent; and an aromatic epoxy resin+a Sb-A type curing agent) according to the present invention are thermally cured.

In order to determine the latency properties of the epoxy resin curing systems according to the present invention, the rate of conversion for each composition (4 kinds as suggested in FIG. 8) at both 150° C. and 50° C. was measured as a function of time. The results are shown in FIG. 8.

Figure 9:
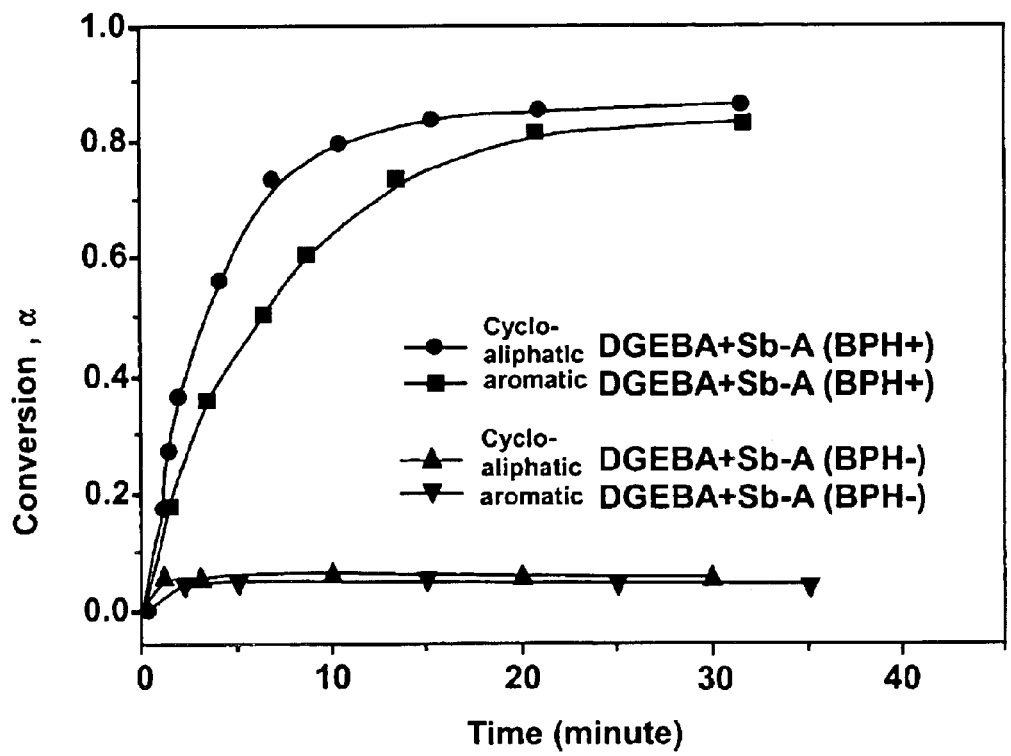
FIG. 9 illustrates the relationship between time and conversion when the epoxy resin curing systems (a di-functional epoxy resin+a Sb-A type curing agent; and an aromatic epoxy resin+a Sb-A type curing agent) according to the present invention are cured by light with or without the use of the catalyst (BPH).

At 150° C., the curing systems exhibited a conversion rate of approximately 80% and a high level of activity. In contrast, at 50° C., the curing systems exhibited almost no activity, which suggests latency property. In addition, the relationship between time and the conversion rate is shown in FIG. 9, for two reactions, one in which a catalyst is added and one in which a catalyst is not added to UV cured systems. According to FIG. 9, it was found that the cured systems exhibited similar results to those of heat cured systems, demonstrating high levels of latency on exposure to light. As a matter of fact, when a mixture of an epoxy resin of low molecular weight before curing and a latent catalytic curing agent is left at room temperature, the mixture exhibited a storage property of between two and six months. These experiments are explained in greater detail by way of working examples mentioned below.

Figure 10:
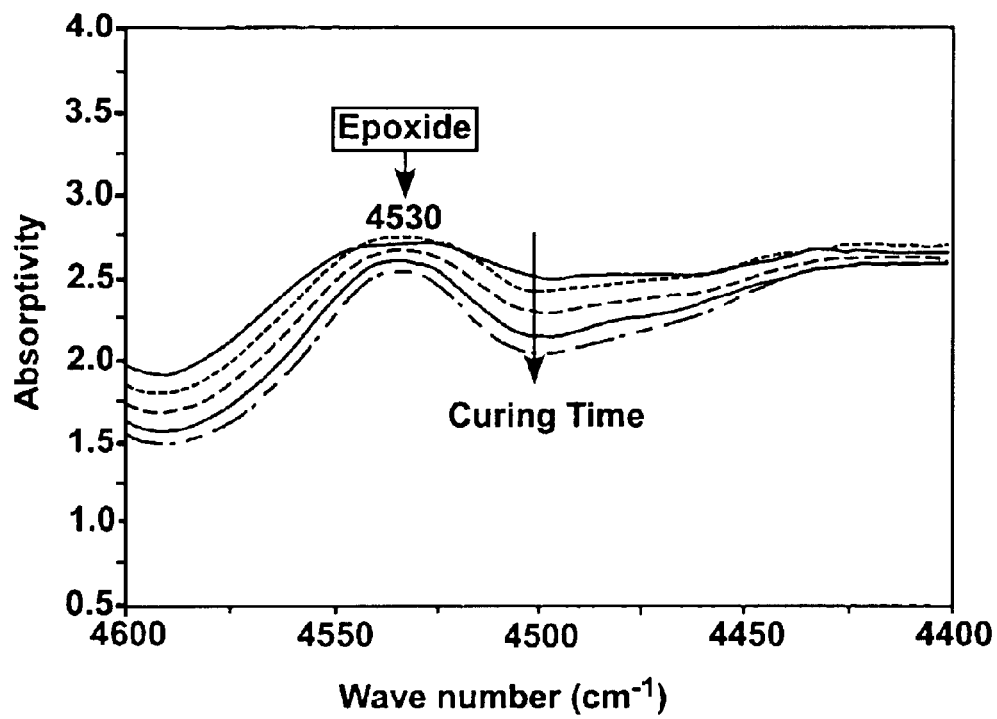
FIG. 10 illustrates the variation of the Near-IR peak of the epoxy resin curing system (a di-functional epoxy resin+a Sb-A type curing agent) according to the present invention.

FIG. 10 illustrates the results of Near-IR measurement in accordance with curing time in the case of curing the epoxy resin curing system comprising a difunctional epoxy resin YD-128 and a Sb-A type curing agent. It was confirmed that the absorptional peaks decreased as time passed by. This is because the epoxy group in the form of 3-membered ring participated in the ring opening reaction, thereby the ring opening may contribute to the occurrence of expansion of volume and cross linking reactions.

Figure 11:
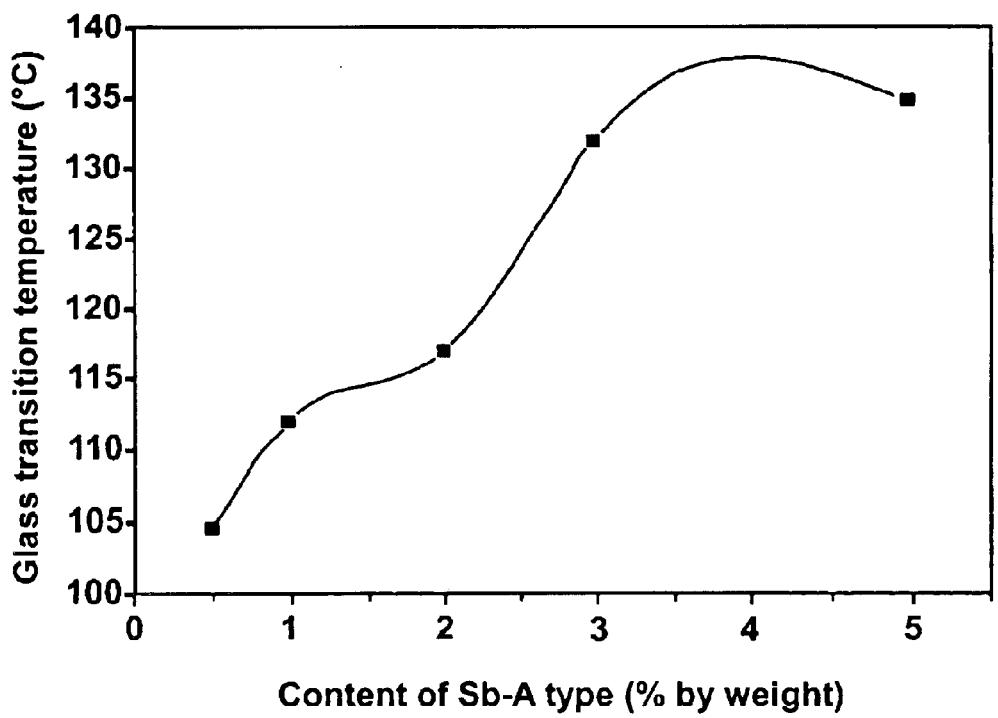
FIG. 11 illustrates the glass transition temperature ($T_g$) according to the content of the catalyst in the epoxy resin curing system (a di-functional epoxy resin+a Sb-A type curing agent) according to the present invention.

FIG. 11 illustrates the glass transition temperature (Tg) according to the content of the catalyst in the epoxy resin curing system in the same amount as employed in said Near-IR measurement. As a result, it was found that the curing system of the present invention did not show significant decrease in glass transition temperature.

The present invention is described in more detail by referring to the following examples and comparative examples without limiting the scope of the invention in any way.

EXAMPLE 1

As a difunctional resin, a diglycidylether of bisphenol A (hereinafter referred to as "DGEBA") type epoxy resin, in a greater detail, "LY 556" manufactured by Ciba-Geigy AG and "YD-128" manufactured by Kukdo Chemicals were used. As a cycloaliphatic difunctional resin (hereinafter referred to as "CAE"), an epoxy resin "ERL 4221" manufactured by Union Carbide Company was used. As a trifunctional resin, "Tactix 742" manufactured by Dow Chemicals and "YH 300" manufactured by Kukdo chemicals were used. As a tetrafunctional epoxy resin, "MY720" manufactured by Ciba-Geigy AG, was used. The latent cationic curing agent (the latent cationic curing agent containing a hexafluoroantimonate) was synthesized by the use of benzyl bromide, pyrazine and pyridine as starting materials (Y. C. Kim, S. J. Park, and J. R. Lee, *Polymer J.*, 29, 759 (1997)). More particularly, for example, the method for synthesizing Sb-A type curing agent was explained as follows. To a 250 ml flask equipped with a stirrer, 60 g (20 mmol) of pyrazine and 7.30 g (42.7 mmol) of benzyl bromide were charged and reacted by mixing them at room temperature for 24 hours. Subsequently, the reaction solution was filtered to obtain a benzylpyrazinium bromide in white color. This benzylpyrazinium bromide was dissolved in 30 ml of distilled water and filtered to obtain a solution in which no purity (insoluble material) was contained. To said solution 5.17 g (20 mmol) of $NaSbF_6$ was added to obtain a white product, which was then subjected to recrystallization by the use of methyl alcohol to give 4.84 g of N-benzylpyrazinium hexafluoroantimonate (BPH; a sort of Sb-A type curing agent, cationic latent catalytic curing agent containing hexafluoroantimonate) as a white reaction product.

The epoxy resin and a cationic latent catalytic curing agent containing hexafluoroantimonate (it is not limited to Sb-A type exemplified as above) are combined in an amount suggested in Tables 1 to 26 to form epoxy resin curing systems to be used in examples. In addition, the curing reaction of the epoxy resin curing systems was carried out by the use of either heat curing or UV curing.

In the case of thermal curing, the resins were subjected to heat for one hour at 120° C., 2 hours at 150° C. or 2 hours at 180° C. In the case of light curing, the curing reaction may be carried out by using a mold made of a transparent material by which light passes, keeping the distance between the sample and the lamp at 12 cm, and irradiating UV both at the front area and the back area for 3 hours, respectively.

EXAMPLE 2

As explanation for the volume expansion property of the epoxy resin curing system, one reason could be due to the reaction mechanism, in which the epoxide groups constructed by covalent bonding of a 3-membered ring are converted via a ring opening reaction to a van der Waals bonding, of which molecular distance is longer than that of the covalent bonding. Such a fact can be confirmed from the change of the functional groups within resins, measured by Perstorp Analytical NIR System 16500 type (Near-IR spectroscopy) and the results are shown in FIG. 10. The five patterns in FIG. 11 illustrate the five peaks according to the change of time when an epoxy resin curing system is cured. It can also be seen from FIG. 11 that the number of the hydroxyl groups increased and the number of epoxide groups decreased, which indirectly confirmed the increase of the bonding length owing to the ring opening reaction.

EXAMPLE 3

Measuring the density of a solid makes it possible to estimate the degree of change in physical properties. The change in density of a single specimen arises from the change in crystallinity, the loss of additives (whether additives are added or not) or solvent adsorption. In this example, the density change before and after curing reaction of the epoxide resin curing system exemplified in Example 1 was measured.

In order to determine the density of the epoxy resin (namely, a monomer of low molecular weight and a polymer of high molecular weight) before and after curing, a latent catalyst for each content was added to an epoxy resin and then the resulting mixture was subjected to depression in a vacuum pump in order to remove foam. The density of the liquid before the curing was measured by use of 10 ml mass cylinder in accordance with ASTM D-792. The density of the polymer cured by the method described in Example 1 (epoxy resin cured product) was measured by use of density gradient tube in accordance with ASTM D-792. The composition of the epoxy resin curing system used and the results are summarized in the following Tables 1 to 26. In the Tables, the term "density of curing system" indicates the density of the curing system after curing reaction (the density of the cured product).

TABLE 1

Sb-A + cycloaliphatic epoxy (CAE)

| Amount of Catalyst | Density of uncured mixture | Density of curing system (g/cm$^3$) | | Shrinkage rate % (−) or Expansion rate % (+) | |
|---|---|---|---|---|---|
| (% by weight) | (g/cm$^3$) | Heat Cure | U.V Cure | Heat Cure | U.V Cure |
| 0.00005 | 1.1950 | 1.2410 | 1.2400 | −3.71 | −3.63 |
| 0.00001 | 1.2040 | 1.2035 | 1.2032 | +0.04 | +0.07 |
| 0.01 | 1.2370 | 1.2050 | 1.2048 | +2.65 | +2.67 |
| 0.05 | 1.2390 | 1.2060 | 1.2058 | +2.74 | +2.75 |
| 0.1 | 1.2400 | 1.1947 | 1.1945 | +3.79 | +3.81 |
| 0.5 | 1.2429 | 1.2010 | 1.1995 | +3.49 | +3.62 |
| 1 | 1.2450 | 1.2040 | 1.2005 | +3.41 | +3.71 |
| 2 | 1.2671 | 1.2065 | 1.2012 | +5.02 | +5.48 |
| 3 | 1.2683 | 1.2185 | 1.2023 | +4.09 | +5.49 |
| 5 | 1.2770 | 1.2270 | 1.2105 | +4.07 | +5.49 |
| 11 | 1.2780 | 1.2290 | 1.2110 | +3.99 | +5.53 |

TABLE 2

Sb-A + aromatic difunctional epoxy (YD-128)

| Amount of Catalyst | Density of uncured mixture | Density of curing system (g/cm$^3$) | | Shrinkage rate % (−) or Expansion rate % (+) | |
|---|---|---|---|---|---|
| (% by weight) | (g/cm$^3$) | Heat Cure | U.V Cure | Heat Cure | U.V Cure |
| 13 | 1.2410 | 1.2378 | 1.2302 | +0.26 | +0.87 |
| 15 | 1.2580 | 1.2405 | 1.2367 | +1.39 | +1.69 |
| 20 | 1.2595 | 1.2440 | 1.2395 | +1.23 | +1.59 |
| 25 | 1.2600 | 1.2448 | 1.2402 | +1.21 | +1.57 |

TABLE 3

Sb-B + aromatic difunctional epoxy (LY556)

| Amount of Catalyst | Density of uncured mixture | Density of curing system (g/cm$^3$) | | Shrinkage rate % (−) or Expansion rate % (+) | |
|---|---|---|---|---|---|
| (% by weight) | (g/cm$^3$) | Heat Cure | U.V Cure | Heat Cure | U.V Cure |
| 0.00005 | 1.1605 | 1.1745 | 1.1723 | −1.19 | −1.00 |
| 0.00001 | 1.1782 | 1.1771 | 1.1768 | +0.09 | +0.12 |
| 0.01 | 1.1967 | 1.1950 | 1.1932 | +0.14 | +0.29 |
| 0.05 | 1.2125 | 1.1789 | 1.1745 | +2.85 | +3.24 |
| 1 | 1.2270 | 1.2015 | 1.1995 | +2.12 | +2.29 |
| 3 | 1.2327 | 1.2075 | 1.2031 | +2.08 | +2.46 |
| 5 | 1.2280 | 1.2025 | 1.2003 | +2.08 | +2.26 |
| 11 | 1.2350 | 1.2080 | 1.2033 | +2.23 | +2.63 |
| 20 | 1.2280 | 1.2025 | 1.2003 | +2.08 | +2.26 |

TABLE 4

Sb-C + CAE

| Amount of Catalyst | Density of uncured mixture | Density of curing system (g/cm$^3$) | | Shrinkage rate % (−) or Expansion rate % (+) | |
|---|---|---|---|---|---|
| (% by weight) | (g/cm$^3$) | Heat Cure | U.V Cure | Heat Cure | U.V Cure |
| 0.00005 | 1.1505 | 1.1592 | 1.1565 | −0.75 | −0.52 |
| 0.00001 | 1.1785 | 1.1702 | 1.1675 | +0.71 | +0.94 |
| 0.01 | 1.1805 | 1.1705 | 1.1697 | +0.85 | +0.92 |
| 0.05 | 1.2143 | 1.1865 | 1.1785 | +2.34 | +3.03 |
| 1 | 1.2168 | 1.1941 | 1.1865 | +1.90 | +2.55 |
| 2 | 1.2250 | 1.2025 | 1.1984 | +1.87 | +2.21 |
| 3 | 1.2272 | 1.2080 | 1.1999 | +1.59 | +2.27 |

TABLE 4-continued

Sb-C + CAE

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 5 | 1.2283 | 1.2088 | 1.2008 | +1.61 | +2.29 |
| 11 | 1.2285 | 1.2090 | 1.2011 | +1.61 | +2.28 |

TABLE 5

Sb-C + aromatic difunctional epoxy (YD-128)

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 5 | 1.2168 | 1.1959 | 1.1889 | +1.72 | +2.29 |
| 10 | 1.2200 | 1.2029 | 1.1980 | +1.40 | +1.80 |
| 20 | 1.2230 | 1.2091 | 1.1998 | +1.14 | +1.90 |
| 25 | 1.2251 | 1.2098 | 1.2004 | +1.24 | +2.01 |

TABLE 6

Sb-D + Trifunctional epoxy resin (Tactix 742)

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 0.00005 | 1.1490 | 1.1533 | 1.1523 | −0.39 | −0.30 |
| 0.00001 | 1.1601 | 1.1591 | 1.1587 | +0.09 | +0.12 |
| 0.05 | 1.1789 | 1.1775 | 1.1692 | +0.12 | +0.78 |
| 0.1 | 1.2046 | 1.1824 | 1.1789 | +1.69 | +1.99 |
| 0.5 | 1.2065 | 1.1932 | 1.1893 | +1.04 | +1.38 |
| 1 | 1.2103 | 1.1995 | 1.1982 | +0.92 | +0.98 |
| 3 | 1.2108 | 1.1998 | 1.1985 | +0.91 | +1.02 |
| 5 | 1.2112 | 1.2004 | 1.1988 | +0.90 | +1.03 |
| 11 | 1.2115 | 1.2007 | 1.1992 | +0.89 | +1.02 |

TABLE 7

Sb-D + YD-128

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 3 | 1.2036 | 1.1834 | 1.1799 | +1.68 | +1.97 |
| 5 | 1.2061 | 1.1938 | 1.1898 | +1.02 | +1.35 |
| 10 | 1.2105 | 1.1992 | 1.1983 | +0.93 | +0.99 |
| 15 | 1.2114 | 1.2005 | 1.1995 | +0.90 | +0.98 |

TABLE 8

Sb-E + Tetrafunctional epoxy resin (MY720)

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 0.00005 | 1.1505 | 1.1537 | 1.1517 | −0.27 | −0.13 |
| 0.00001 | 1.1604 | 1.1589 | 1.1578 | +0.13 | +0.22 |
| 0.01 | 1.1725 | 1.1612 | 1.1602 | +0.97 | +1.06 |
| 0.05 | 1.1838 | 1.1681 | 1.1620 | +1.34 | +1.88 |
| 0.1 | 1.1974 | 1.1690 | 1.1679 | +2.42 | +2.53 |
| 0.5 | 1.2091 | 1.1721 | 1.1705 | +3.15 | +3.29 |
| 1 | 1.2153 | 1.1751 | 1.1732 | +2.83 | +3.06 |
| 3 | 1.2198 | 1.1755 | 1.1751 | +3.76 | +3.80 |
| 5 | 1.2201 | 1.1760 | 1.1789 | +3.75 | +3.50 |
| 11 | 1.2205 | 1.1762 | 1.1791 | +3.76 | +3.51 |

TABLE 9

Sb-E + YD-128

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 5 | 1.1830 | 1.1688 | 1.1624 | +1.20 | +1.74 |
| 10 | 1.1945 | 1.1700 | 1.1694 | +2.05 | +2.10 |
| 20 | 1.2001 | 1.1731 | 1.1705 | +2.25 | +2.47 |
| 30 | 1.2103 | 1.1760 | 1.1732 | +2.83 | +3.06 |
| 35 | 1.2138 | 1.1802 | 1.1772 | +2.77 | +3.02 |

TABLE 10

Sb-F + CAE

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 0.00005 | 1.1540 | 1.1593 | 1.1575 | −0.46 | −0.30 |
| 0.00001 | 1.1574 | 1.1568 | 1.1559 | +0.05 | +0.13 |
| 0.01 | 1.1653 | 1.1607 | 1.1593 | +0.40 | +0.52 |
| 0.05 | 1.1751 | 1.1682 | 1.1626 | +0.60 | +1.08 |
| 0.1 | 1.1842 | 1.1703 | 1.1693 | +1.20 | +1.27 |
| 2 | 1.1953 | 1.1731 | 1.1696 | +1.89 | +2.20 |
| 5 | 1.1996 | 1.1784 | 1.1713 | +1.80 | +2.41 |
| 11 | 1.2015 | 1.1807 | 1.1782 | +1.76 | +1.98 |

TABLE 11

Sb-F + YD-128

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 5 | 1.1750 | 1.1680 | 1.1624 | +0.60 | +1.07 |
| 10 | 1.1841 | 1.1705 | 1.1690 | +1.15 | +1.28 |
| 20 | 1.1952 | 1.1730 | 1.1698 | +1.86 | +2.13 |
| 30 | 1.1997 | 1.1782 | 1.1715 | +1.79 | +2.35 |
| 35 | 1.2014 | 1.1805 | 1.1789 | +1.74 | +1.87 |

TABLE 12

Sb-G + LY556

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 0.00005 | 1.1494 | 1.1541 | 1.1531 | −0.41 | −0.32 |
| 0.00001 | 1.1611 | 1.1608 | 1.1601 | +0.03 | +0.09 |
| 0.1 | 1.1788 | 1.1773 | 1.1700 | +0.13 | +0.75 |
| 0.5 | 1.2042 | 1.1837 | 1.1803 | +1.68 | +1.97 |
| 1 | 1.2066 | 1.1942 | 1.1903 | +1.03 | +1.37 |
| 3 | 1.2107 | 1.1996 | 1.1993 | +0.92 | +0.97 |
| 15 | 1.2118 | 1.2010 | 1.2000 | +0.89 | +0.96 |

TABLE 13

Sb-G + LY556

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 5 | 1.1710 | 1.1642 | 1.1585 | +0.58 | +1.06 |
| 10 | 1.1801 | 1.1662 | 1.1640 | +1.18 | +1.36 |
| 20 | 1.1912 | 1.1695 | 1.1654 | +1.82 | +2.17 |
| 30 | 1.1957 | 1.1740 | 1.1713 | +1.81 | +2.30 |

TABLE 14

Sb-H + Tactix742

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 0.00005 | 1.1505 | 1.1594 | 1.1572 | −0.77 | −0.58 |
| 0.00001 | 1.1620 | 1.1614 | 1.1610 | +0.05 | +0.09 |
| 0.01 | 1.1798 | 1.1790 | 1.1697 | +0.07 | +0.86 |
| 0.05 | 1.2054 | 1.1825 | 1.1801 | +1.94 | +2.14 |
| 0.1 | 1.2081 | 1.1934 | 1.1900 | +1.23 | +1.52 |
| 2 | 1.2129 | 1.1991 | 1.1989 | +1.15 | +1.17 |
| 5 | 1.2148 | 1.2005 | 1.1995 | +1.19 | +1.27 |
| 11 | 1.2258 | 1.2145 | 1.2081 | +0.93 | +1.47 |

TABLE 15

Sb-H + YD-128

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 3 | 1.2161 | 1.1894 | 1.1851 | +2.20 | +2.55 |
| 10 | 1.2173 | 1.1907 | 1.1899 | +2.19 | +2.25 |
| 20 | 1.2205 | 1.2045 | 1.1953 | +1.31 | +2.06 |
| 25 | 1.2235 | 1.2134 | 1.2005 | +0.82 | +1.88 |
| 30 | 1.2256 | 1.2150 | 1.2084 | +0.86 | +1.40 |

TABLE 16

Sb-I + MY720

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 0.00005 | 1.1593 | 1.1642 | 1.1632 | −0.42 | −0.34 |
| 0.00001 | 1.1689 | 1.1671 | 1.1612 | +0.15 | +0.66 |
| 0.1 | 1.1788 | 1.1755 | 1.1700 | +0.28 | +0.75 |
| 1 | 1.2049 | 1.1846 | 1.1800 | +1.71 | +1.03 |
| 3 | 1.2165 | 1.1933 | 1.1899 | +1.94 | +2.24 |
| 5 | 1.2189 | 1.1945 | 1.1925 | +2.04 | +2.21 |
| 11 | 1.2211 | 1.1989 | 1.1975 | +1.85 | +1.97 |

TABLE 17

Sb-I + YD-128

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 3 | 1.2041 | 1.1839 | 1.1804 | +1.68 | +1.97 |
| 5 | 1.2067 | 1.1943 | 1.1902 | +1.03 | +1.37 |
| 15 | 1.2109 | 1.1997 | 1.1992 | +0.92 | +0.97 |
| 25 | 1.2119 | 1.2011 | 1.2001 | +0.89 | +0.96 |

TABLE 18

Sb-J + CAE

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 0.00005 | 1.1530 | 1.1671 | 1.1638 | −1.21 | −0.93 |
| 0.00001 | 1.1835 | 1.1802 | 1.1754 | +0.28 | +0.69 |
| 0.01 | 1.1971 | 1.1840 | 1.1812 | +1.11 | +1.35 |
| 0.05 | 1.2325 | 1.1900 | 1.1832 | +3.57 | +4.17 |
| 1 | 1.2387 | 1.1966 | 1.1885 | +3.51 | +4.22 |
| 5 | 1.2402 | 1.2019 | 1.1957 | +3.18 | +3.72 |
| 11 | 1.2425 | 1.2075 | 1.2007 | +2.89 | +3.48 |

TABLE 19

Sb-J + YD-128

| Amount of Catalyst (% by weight) | Density of uncured mixture (g/cm³) | Density of curing system (g/cm³) | | Shrinkage rate % (−) or Expansion rate % (+) | |
|---|---|---|---|---|---|
| | | Heat Cure | U.V Cure | Heat Cure | U.V Cure |
| 3 | 1.2256 | 1.1904 | 1.1851 | +2.87 | +3.30 |
| 5 | 1.2270 | 1.2007 | 1.1994 | +2.14 | +2.25 |
| 15 | 1.2320 | 1.2019 | 1.2000 | +2.44 | +2.60 |
| 20 | 1.2333 | 1.2032 | 1.2008 | +2.43 | +2.63 |

TABLE 20

Sb-K + LY556

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 0.00005 | 1.1643 | 1.1934 | 1.1904 | −2.44 | −2.19 |
| 0.00001 | 1.1936 | 1.1926 | 1.1918 | +0.08 | +0.15 |
| 0.01 | 1.2099 | 1.2001 | 1.1990 | +0.82 | +0.91 |
| 0.05 | 1.2157 | 1.1988 | 1.1905 | +1.41 | +2.12 |
| 0.1 | 1.2215 | 1.1963 | 1.1912 | +2.11 | +2.54 |
| 0.5 | 1.2296 | 1.1950 | 1.1906 | +2.89 | +3.28 |
| 1 | 1.2300 | 1.1847 | 1.1807 | +3.82 | +4.18 |
| 2 | 1.2351 | 1.1948 | 1.1905 | +3.37 | +3.75 |
| 3 | 1.2391 | 1.1998 | 1.1975 | +3.28 | +3.47 |
| 5 | 1.2450 | 1.2052 | 1.2034 | +3.30 | +3.46 |
| 11 | 1.2454 | 1.2057 | 1.2038 | +3.29 | +3.45 |

TABLE 21

Sb-K + YD-128

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 5 | 1.2045 | 1.1953 | 1.1901 | +0.76 | +1.20 |
| 15 | 1.2383 | 1.2144 | 1.2043 | +1.93 | +2.75 |
| 25 | 1.2420 | 1.2294 | 1.2185 | +1.01 | +1.89 |
| 35 | 1.2480 | 1.2347 | 1.12248 | +1.0 | +1.86 |

TABLE 22

Sb-L + Tactix742

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 0.00005 | 1.1544 | 1.1835 | 1.1805 | −2.46 | −2.21 |
| 0.00001 | 1.1837 | 1.1828 | 1.1820 | +0.08 | +0.14 |
| 0.01 | 1.1998 | 1.1901 | 1.1890 | +0.82 | +0.91 |
| 0.05 | 1.2057 | 1.1948 | 1.1899 | +0.91 | +1.33 |
| 0.1 | 1.2395 | 1.2130 | 1.2001 | +3.25 | +3.28 |
| 1 | 1.2499 | 1.2102 | 1.2092 | +3.28 | +3.37 |
| 3 | 1.2540 | 1.2134 | 1.2124 | +3.34 | +3.43 |
| 5 | 1.2584 | 1.2175 | 1.2159 | +3.36 | +3.49 |
| 11 | 1.2598 | 1.2179 | 1.2178 | +3.44 | +3.45 |

TABLE 23

Sb-L + YD-128

| Amount of Catalyst (% by weight) | Density of uncured mixture (g/cm$^3$) | Density of curing system (g/cm$^3$) | | Shrinkage rate % (−) or Expansion rate % (+) | |
|---|---|---|---|---|---|
| | | Heat Cure | U.V Cure | Heat Cure | U.V Cure |
| 5 | 1.1756 | 1.1685 | 1.1629 | +0.60 | +1.08 |
| 10 | 1.1846 | 1.1710 | 1.1696 | +1.15 | +1.27 |
| 15 | 1.1957 | 1.1735 | 1.1703 | +1.86 | +2.12 |
| 25 | 1.2012 | 1.1790 | 1.1765 | +1.84 | +2.06 |

TABLE 24

LY556 + YH300 + Sb-A (0.00001 wt %)
(Blend type of a difunctional and a trifunctional epoxy)

| Amount of Catalyst (% by weight) | Density of uncured mixture (g/cm³) | Density of curing system (g/cm³) Heat Cure | Density of curing system (g/cm³) U.V Cure | Shrinkage rate % (−) or Expansion rate % (+) Heat Cure | Shrinkage rate % (−) or Expansion rate % (+) U.V Cure |
|---|---|---|---|---|---|
| 0   | 1.2342 | 1.2223 | 1.2218 | +0.97 | +1.01 |
| 20  | 1.2261 | 1.2012 | 1.2007 | +2.04 | +2.11 |
| 40  | 1.2010 | 1.1910 | 1.1902 | +0.83 | +0.91 |
| 60  | 1.1921 | 1.1910 | 1.1901 | +0.08 | +0.17 |
| 80  | 1.2112 | 1.1891 | 1.1782 | +1.82 | +1.86 |
| 100 | 1.1802 | 1.1712 | 1.1703 | +0.76 | +0.85 |

TABLE 25

LY556 + YH300 + Sb-A (0.01 wt %)
(Blend type of a difunctional and a trifunctional epoxy)

| Amount of Catalyst (% by weight) | Density of uncured mixture (g/cm³) | Density of curing system (g/cm³) Heat Cure | Density of curing system (g/cm³) U.V Cure | Shrinkage rate % (−) or Expansion rate % (+) Heat Cure | Shrinkage rate % (−) or Expansion rate % (+) U.V Cure |
|---|---|---|---|---|---|
| 0   | 1.2422 | 1.2218 | 1.2210 | +1.67 | +1.74 |
| 20  | 1.2361 | 1.2019 | 1.2011 | +2.85 | +2.91 |
| 40  | 1.2110 | 1.1921 | 1.1913 | +1.59 | +1.65 |
| 60  | 1.1998 | 1.1935 | 1.1917 | +0.53 | +0.68 |
| 80  | 1.2252 | 1.1905 | 1.1818 | +2.91 | +3.67 |
| 100 | 1.1972 | 1.1873 | 1.1792 | +0.83 | +1.53 |

TABLE 26

LY556 + YH300 + Sb-A (11 wt %)
(Blend type of a difunctional and a trifunctional epoxy)

| Amount of Catalyst (% by weight) | Density of uncured mixture (g/cm³) | Density of curing system (g/cm³) Heat Cure | Density of curing system (g/cm³) U.V Cure | Shrinkage rate % (−) or Expansion rate % (+) Heat Cure | Shrinkage rate % (−) or Expansion rate % (+) U.V Cure |
|---|---|---|---|---|---|
| 0   | 1.2482 | 1.2329 | 1.2280 | +1.24 | +1.64 |
| 20  | 1.2451 | 1.2215 | 1.2097 | +1.63 | +2.93 |
| 40  | 1.2340 | 1.2107 | 1.1987 | +1.92 | +2.94 |
| 60  | 1.2089 | 1.1978 | 1.1925 | +0.93 | +1.38 |
| 80  | 1.2425 | 1.2199 | 1.2045 | +1.85 | +3.15 |
| 100 | 1.2107 | 1.1965 | 1.1841 | +1.19 | +2.25 |

As seen from the results summarized in Tables 1 to 26, most of the epoxy resin curing systems after curing (namely, epoxy resin cured products) showed an expansion of volume in comparison to the epoxy resin curing systems before curing, regardless of curing methods, either heat curing or UV curing.

Meanwhile, as shown in Table 1, it was observed that the epoxy resin curing systems containing the Sb-A type catalyst in an amount of 0.00005% by weight showed a little shrinkage in volume. However, it was confirmed that the epoxy resin curing systems according to the present invention have at least characteristic property capable of reducing the shrinkage of volume due to curing reactions in almost entire cases, in view of the fact that the curing reaction of the general epoxy resin system caused a 3 to 15% shrinkage in volume.

EXAMPLE 4

In order to determine the thermal latent property of the curing systems according to the present invention, the rate of conversion was measured as a function of time at both 50° C. and 150° C. for an epoxy resin curing system A (a cycloaliphatic type DGEBA (epoxy resin)+a Sb-A (curing agent); and an epoxy resin curing system B (an aromatic DGEBA (epoxy resin)+a Sb-A (curing agent) by use of a thermal analysis tester, Dupont DSC910, equipped with a thermal controller, TA2100. The results are shown in FIG. 8.

According to FIG. 8, at 150° C., both epoxy resin curing systems A and B exhibited a conversion rate of approximately 80% and a high level of activity. In contrast, at 50° C., the curing systems A and B exhibited no activity as time passed by, which suggests a latency property. In other words, the epoxy resin curing systems of the present invention possess a good storage stability since they did not give rise to curing reactions at low temperatures. Furthermore, the epoxy resin curing systems of the present invention exhibited sufficient conversion rates, which is significantly useful in an industrial view.

EXAMPLE 5

In order to determine the light latent property of the curing systems according to the present invention, the rate of conversion was measured as a function of curing time at room temperature for epoxy resin curing systems consisting of an ELC 4000UV curing agent and an epoxy resin, for example, an epoxy resin curing system C1 (a cycloaliphatic type DGEBA (epoxy resin)+a Sb-A (curing agent); and an epoxy resin curing system D1 (an aromatic DGEBA (epoxy resin)+a Sb-A (curing agent) by use of FT-IR analysis.

In addition, the rate of conversion (represented as "absorbance") was measured as a function of curing time at room temperature for epoxy resin curing systems consisting of said epoxy resin curing system C1 and C2 together with BPH (a kind of Sb-A type curing agent), for example, an epoxy resin curing system C2 (a cycloaliphatic type DGEBA (epoxy resin)+a Sb-A (curing agent)+BPH (catalyst)); and an epoxy resin curing system D2 (an aromatic DGEBA (epoxy resin)+a Sb-A (curing agent)+BPH (catalyst)) by use of FT-IR analysis.

As seen in FIG. 9, the epoxy resin curing systems C1 and D1 containing no BPH catalyst exhibited no activity as time sufficiently passed by, which suggests good storage stability. In contrast, the epoxy resin curing systems C2 and D2 containing BPH catalyst exhibited a conversion rate of approximately 80% and a high level of activity.

EXAMPLE 6

The preparation of samples thermally cured: The latent catalytic curing agent was uniformly mixed with YD-128 as a DGEBA and stirred until a clear liquid was obtained. After depressing the resulting mixture in a vacuum oven for one hour, in order to remove both foam and any residual solvent in the resins, the resins were placed onto a steel plate of 15 cm×20 cm in size, in a mold equipped with 3 mm thick silicon rubber, which acted as a spacer. Then the resins were thermally cured in a convection oven at intervals of 1 hour at 120° C., 2 hours at 150° C. and 2 hours at 180° C. respectively. The rate of increasing temperature was maintained at 5° C./minute.

Although the rate of increasing temperature is not specifically limited, when the rate exceeds 7° C./minute, foaming may occur in the inner side of the curing system owing to the rapid reaction. Accordingly, it is preferred that the rate of increasing temperature is not more than 7° C./minute.

EXAMPLE 7

The preparation of light cured sample: The procedure for preparing resins was essentially the same as that of Example 6 except that a glass plate having 3 mm thickness was used to form a mold in place of a steel plate. The curing was carried out by use of ELC4000 curing agent. The distance between the sample and the lamp was 12 cm, and the curing was carried out by the use of light in wavelength of 365 nm for the curing period of 3 hours directed at the front area and for 3 hours directed at the back area. When the distance between the sample and the lamp is decreased to less than 10 cm, the curing may be influenced by heat in addition to light. When the distance between the sample and the lamp exceeds 15 cm, since the source of energy is not sufficiently trans-ferred to the curing system, the curing is not satisfactorily carried out. Therefore, it is more preferable that the distance between the sample and the lamp is in the range of between 10 cm to 15 cm.

EXAMPLE 8

The glass transition temperature, ($T_g$), of the epoxy resin cured products according to the present invention was determined by the use of "Dupont DSC910" discussed above, in which the temperature was increased at a rate of 10° C./minute from 30° C. to 350° C. In this example, the sample used in the measurement of the glass transition temperature was a thermally cured sample prepared in Example 6. The results are shown in FIG. 11. As seen from the figure, the epoxy resin curing system of this example exhibited no significant decrease in its glass transition temperature.

EXAMPLE 9

Figure 12:
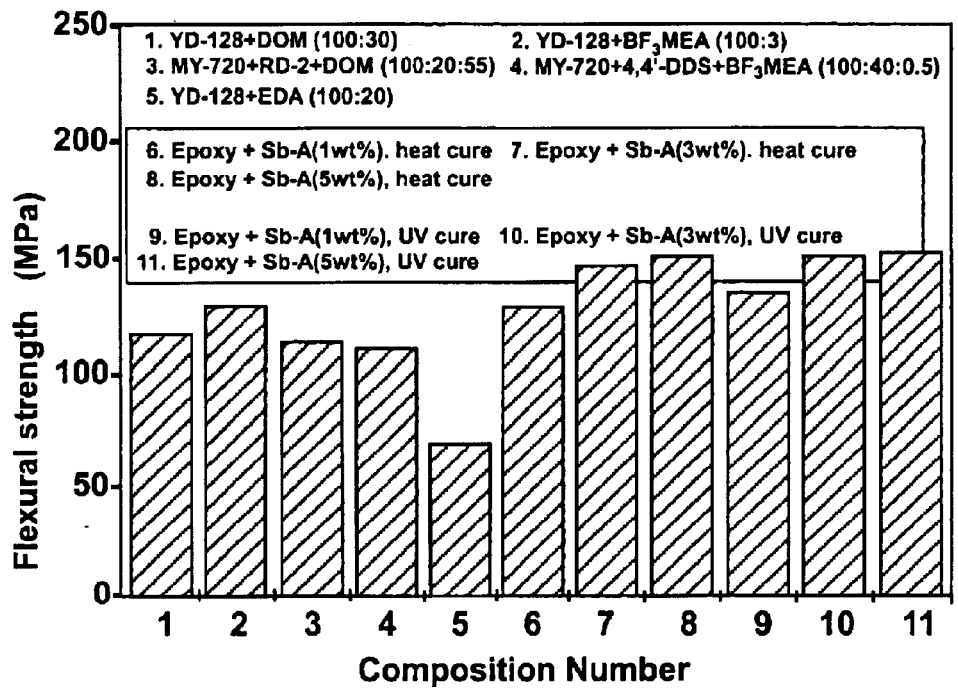
FIG. 12 illustrates the flexural strength of the epoxy resin curing systems according to the present invention in comparison to that of the curing system containing conventional curing agents, divided into those products cured by light and those cured thermally.

The three-point flexural strength of the epoxy resin cured products according to the present invention was measured by the use of thermally cured samples and light cured samples prepared in Examples 6 and 7. The measurement was carried out by the use of an Instron Model 1125, an Instron Flexural Tester, in accordance with ASTM D790. The ratio of distance between supports and weight of sample was fixed at 16:1 and the cross-head speed was maintained at 2 mm/minute. The results are shown in FIG. 12. In FIG. 12, the conventional cured products are represented as 1 to 5 and the epoxy resin cured products according to the present invention are represented as 6 to 11.

As shown in FIG. 12, the conventional cured products obtained by curing the curing systems which do not contain amine type catalytic curing agents possess a flexural strength of approximately 75 to 125 Mpa, while the epoxy resin cured products according to the present invention possess a flexural strength of approximately 125 to 150 Mpa. Accordingly, it was confirmed that the epoxy resin curing systems according to the present invention provide good epoxy resin cured products.

EXAMPLE 10

Figure 13:
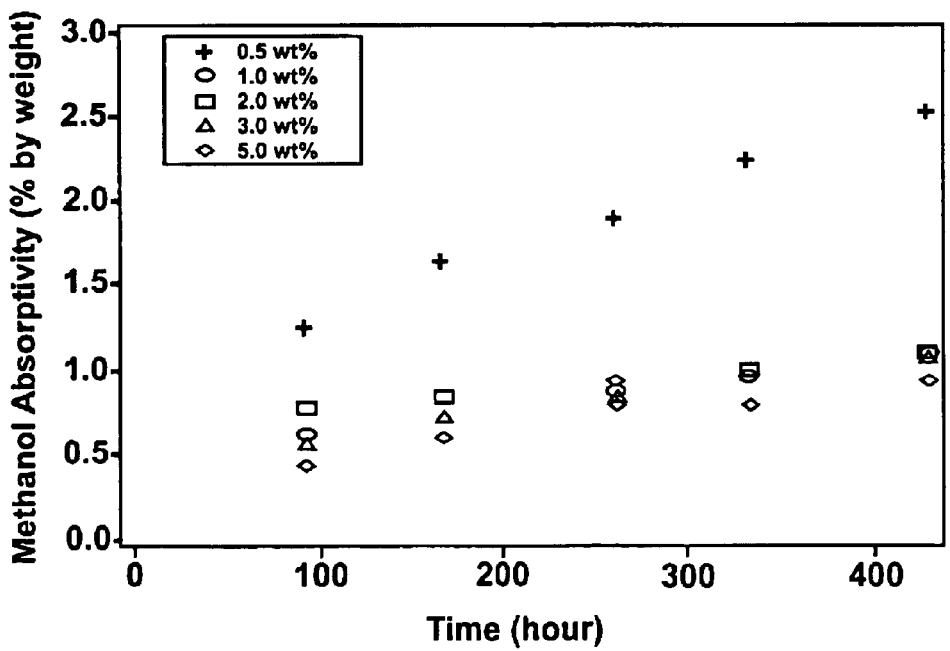
FIG. 13 illustrates the methanol absorptivity of the epoxy resin cured products according to the present invention by preparing the epoxy resin curing system (a di-functional epoxy resin+a Sb-A type curing agent) with variation of the content of the catalyst and then curing the system.
Figure 14:
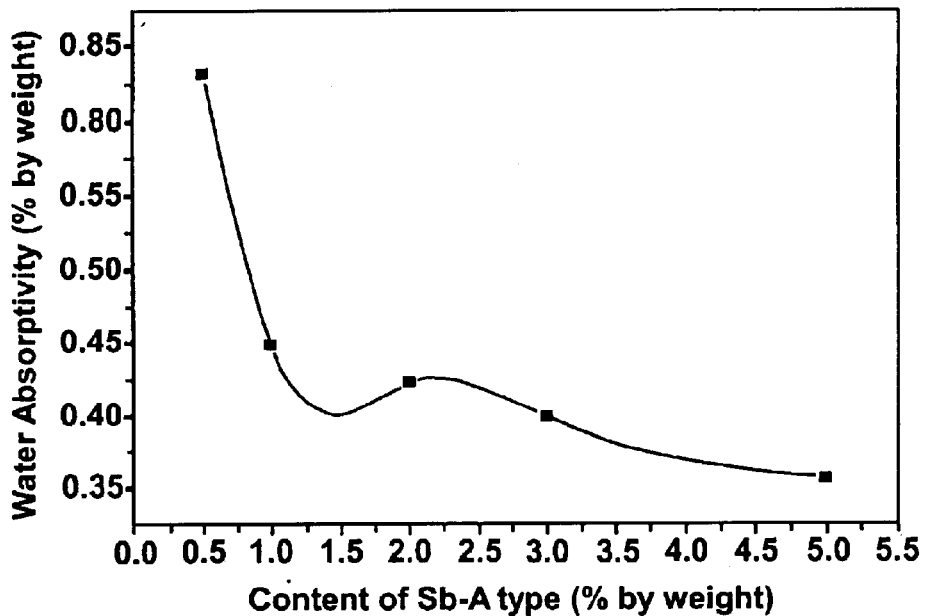
FIG. 14 illustrates the water absorptivity of the epoxy resin cured product according to the present invention obtained by preparing another epoxy resin curing system (a di-functional epoxy resin+a Sb-A type curing agent) with variation of the content of the catalyst and then curing the system.

The absorptivity of methanol and water was measured by the use of the thermally cured samples prepared in Example 6 (or light cured samples) in accordance with ASTM C20-83. The results are shown in FIG. 13 (the absorptivity of methanol) and 14 (the abosorptivity of water). The conventionally cured products obtained by the use of amine type curing agents exhibited methanol absorptivity of approximately 0.5% to 2.5% by weight and water absorptivity of approximately 0.35 to 0.63% by weight. From the results, it was found that the absorptivity of methanol and water of the epoxy resin cured products of the present invention was much lower and the dimensional stability was much higher in comparison to conventionally cured products. It can be indirectly estimated that the expansion of volume in the curing reaction of the epoxy resin curing systems according to the present invention was caused not because of the presence of separated gaps, namely, holes that gave rise to the increase in volume, but because of the formation of complex multiple cross linking structures due to the separated gaps (holes), which may cause an increase in volume.

EXAMPLE 11

The tensile experiments of the sample were conducted by the use of the thermally cured samples prepared in Example 6 (or light cured sample). The measurement was carried out at room temperature by the use of an Instron Model 1125, an Instron Flexural Tester, in accordance with ASTM D638 to measure the tensile strength, tensile modulus and elongation of the samples. The cross-head speed was maintained at 1 mm/minute and the strain gage length was maintained as 50 mm. The results of the tensile experiments are shown in FIGS. 15 and 16.

Figure 15:
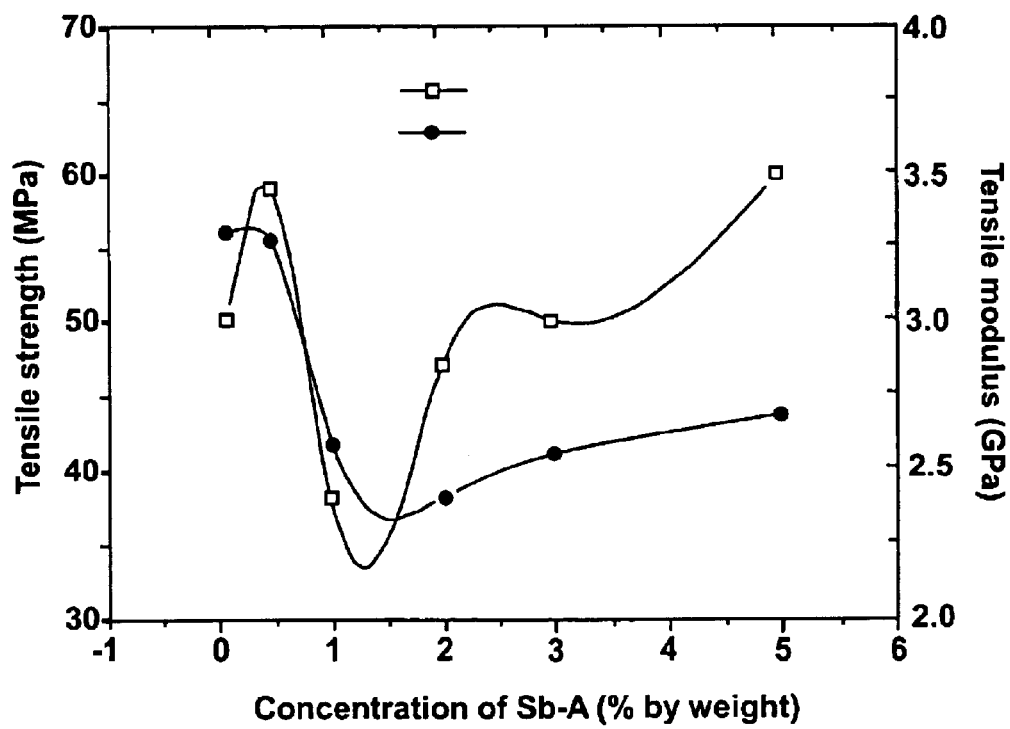
FIG. 15 illustrates the tensile strength and tensile modulus of the epoxy resin cured product according to the present invention by preparing another epoxy resin curing system (a di-functional epoxy resin+a Sb-K type curing agent) with variation of the content of the catalyst and then curing the system.
Figure 16:
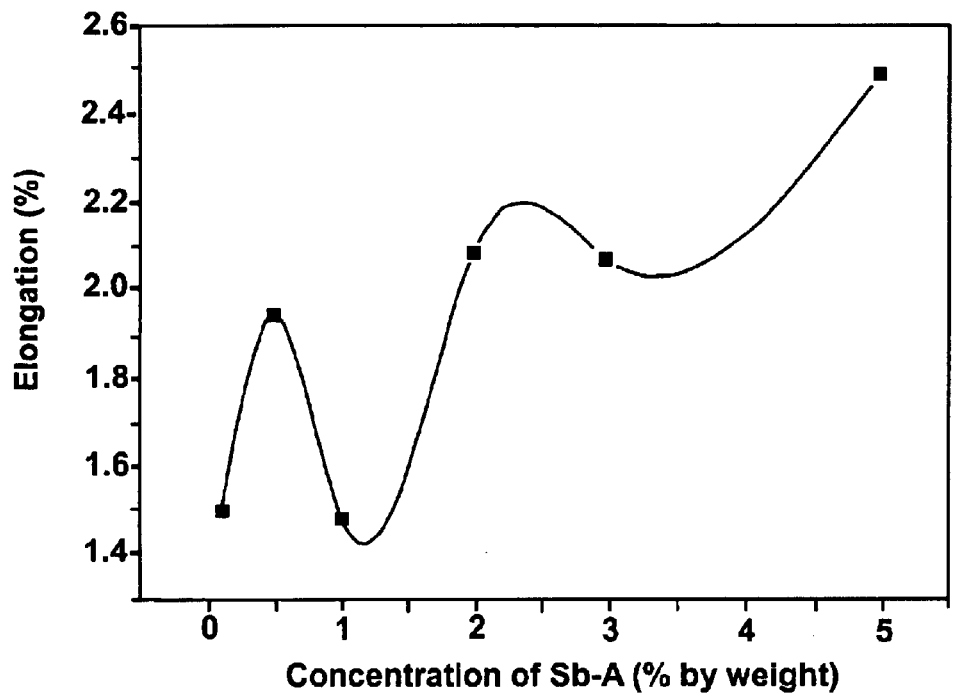
FIG. 16 illustrates the elongation of the epoxy resin cured product according to the present invention by preparing another epoxy resin curing system (a di-functional epoxy resin+a Sb-K type curing agent) with variation of the content of the catalyst and then curing the system.

As shown in FIGS. 15 and 16, the values of the tensile strength, tensile modulus and elongation were lowest when the content of Sb-A type curing agent was about 1% by weight. It was found that when the content of the curing agent was increased, the values of the tensile strength, tensile modulus and elongation were increased accordingly, and thus the epoxy resin cured products possessed excellent physical properties.

EXAMPLE 12

Figure 17:
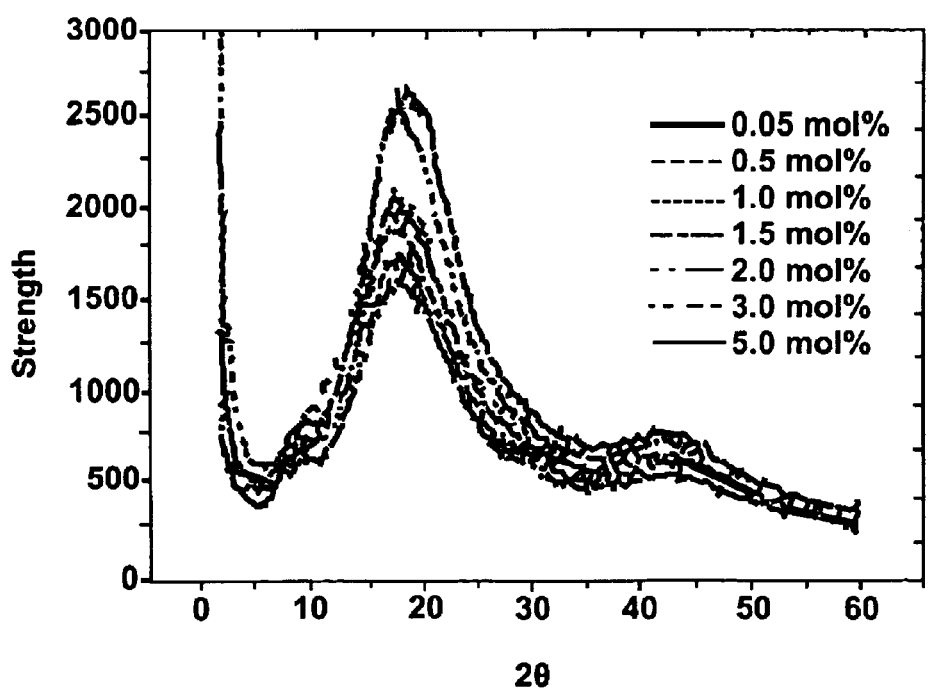
FIG. 17 illustrates the wide angle X-ray analysis results at the time of curing the epoxy resin curing system (an aromatic difunctional epoxy resin (LY556)+a Sb-B type curing agent) according to the present invention.

The epoxy resin curing system consisting of a Sb-B type curing agent and an aromatic difunctional epoxy resin (LY556) was employed in the curing reaction and the wide angle X-ray analysis of the epoxy resin curing system was measured at 120° C. for 1 hour, 150° C. for 2 hours and 180° C. for 2 hours. The results are shown in FIG. 17. According to FIG. 17, it was understood that the Sb-B type curing agent induced the curing reaction as well as provided an arrangement direction in the structure at the time of forming three dimensional cross linking structures. In other words, the lesser the concentration was, the higher the strength was observed, as is shown in FIG. 17. In FIG. 17, the unit of Y axis is cps (count per second) and X axis represents values at angle 0°.

As described in the examples, by the use of the epoxy resin curing systems according to the present invention, it was possible to provide composite materials with excellent physical properties such as no occurrence of initial microcracks or peeling phenomenon. In addition, it was confirmed that the latent catalytic curing agent used in the epoxy resin curing systems of the present invention exhibited high activity with light energy such as ultraviolet light as well as heat, and induced the expansion of volume. Therefore, the epoxy resin curing systems of the present invention is expected to be used in a wide range of applications such as semiconductors, precision industrial chemicals, automobiles and aerospace materials.

Effects of Invention

The epoxy resin curing systems comprising a latent catalytic curing agent containing a hexafluoroantimonate according to the present invention exhibited excellent latency properties in response to heat and light, and much higher glass transition temperature and much better physical properties in comparison to those of conventional expansible curing systems, namely conventional curing systems exhibiting the expansion of volume at the time of curing reaction. In addition, the epoxy resin cured products thereof exhibited excellent mechanical properties. Furthermore, the epoxy resin curing systems of the present invention exhibited a low absorptivity of methanol and water, which in turn proved that a dimensional stability against water and solvent, a big problem in long term use, has been solved.

What is claimed is:

1. An epoxy resin curing system which comprises an epoxy resin and a cationic latent catalytic curing agent containing a hexafluoroantimonate, wherein the epoxy resin curing system has a volume, wherein there is an expansion of the volume or no shrinkage in the volume during curing of the epoxy resin, and wherein the cationic latent catalytic curing agent is selected from the group consisting of:

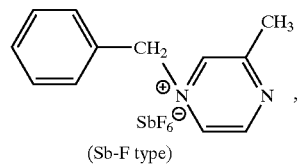
(Sb-F type)

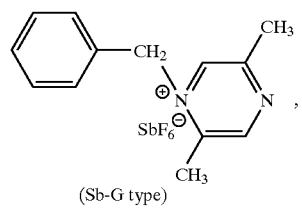
(Sb-G type)

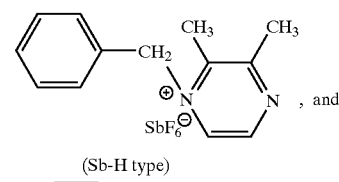
(Sb-H type)

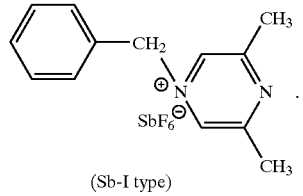
(Sb-I type)

2. The epoxy resin curing system according to claim 1, wherein the cationic latent catalytic curing agent containing a hexafluoroantimonate is used in an amount, wherein if the curing agent is the Sb-F-type curing agent, then the amount is 0.00001 to 35% by weight of the epoxy resin curing system;

wherein if the curing agent is the Sb-G-type curing agent, then the amount is 0.00001 to 30% by weight of the epoxy resin curing system;

wherein if the curing agent is the Sb-H-type curing agent, then the amount is 0.00001 to 30% by weight of the epoxy resin curing system; and wherein if the curing agent is the Sb-I-type curing agent, then the amount is 0.00001 to 25% by weight of the epoxy resin curing system.

3. The epoxy resin curing system as claimed in claim 2, wherein said epoxy resin is at least one resin selected from the group consisting of cycloaliphatic resins, aromatic difunctional resins, aromatic trifunctional resins and aromatic tetrafunctional resins.

4. The epoxy resin curing system according to claim 1, wherein said epoxy resin is at least one resin selected from the group consisting of cycloaliphatic resins, aromatic difunctional resins, aromatic trifunctional resins and aromatic tetrafunctional resins.

5. The epoxy resin curing system as claimed in claim 1, wherein the cationic latent catalytic curing agent is

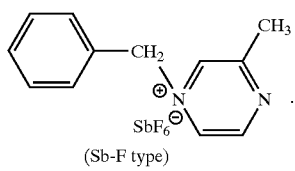

(Sb-F type)

6. The epoxy resin curing system as claimed in claim 1, wherein the cationic latent catalytic curing agent is

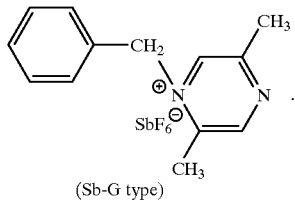

(Sb-G type)

7. The epoxy resin curing system as claimed in claim 1, wherein the cationic latent catalytic curing agent is

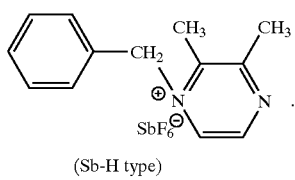

(Sb-H type)

8. The epoxy resin curing system as claimed in claim 1, wherein the cationic latent catalytic curing agent is

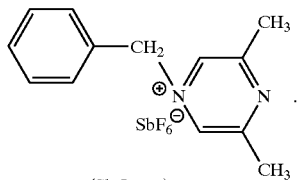

(Sb-I type)

9. A method for producing an epoxy resin cured product by heat curing an epoxy resin curing system, wherein the epoxy resin curing system comprises an epoxy resin and a cationic latent catalytic curing agent containing a hexafluoroantimonate, wherein the epoxy resin curing system has a volume, wherein there is an expansion of the volume or no shrinkage in the volume during curing of the epoxy resin, and wherein the cationic latent catalytic curing agent is selected from the group consisting of:

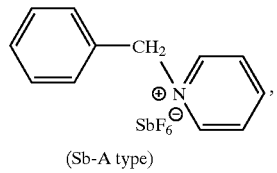

(Sb-A type)

-continued

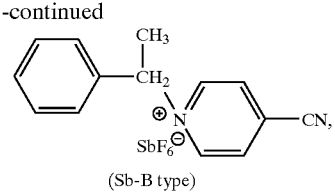

(Sb-B type)

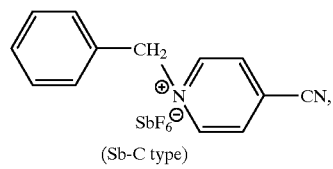

(Sb-C type)

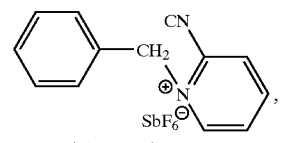

(Sb-D type)

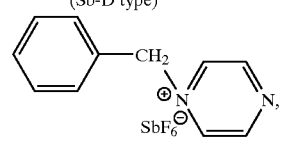

(Sb-E type)

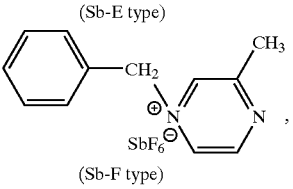

(Sb-F type)

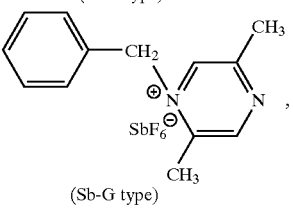

(Sb-G type)

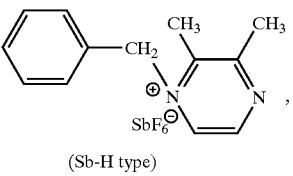

(Sb-H type)

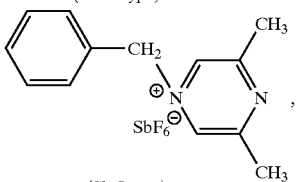

(Sb-I type)

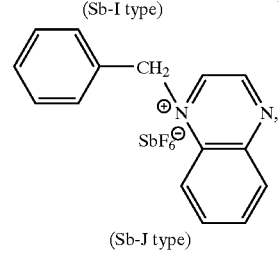

(Sb-J type)

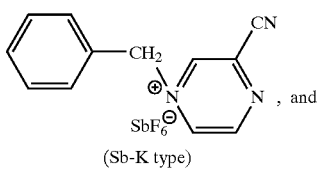

(Sb-K type)

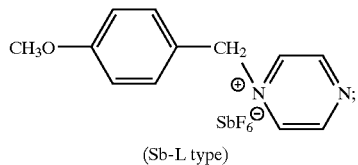

(Sb-L type)

wherein the epoxy resin curing system has a temperature; and wherein the method comprises consecutively increasing the temperature of the epoxy resin curing system from 120° C. to 180° C. at a rate of 3 to 7° C./minute.

10. A method for producing an epoxy resin cured product by light curing epoxy resin curing system, wherein the epoxy resin curing system comprises an epoxy resin and a cationic latent catalytic curing agent containing a hexafluoroantimonate, wherein the epoxy resin curing system has a volume, wherein there is an expansion of the volume or no shrinkage in the volume during curing of the epoxy resin, and wherein the cationic latent catalytic curing agent is selected from the group consisting of:

(Sb-A type)

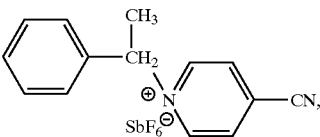

(Sb-B type)

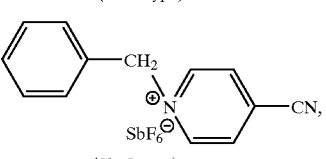

(Sb-C type)

(Sb-D type)

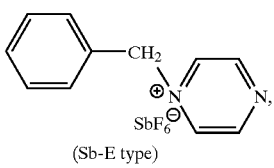

(Sb-E type)

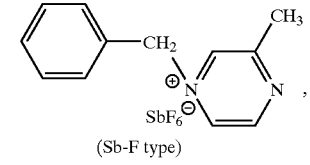

(Sb-F type)

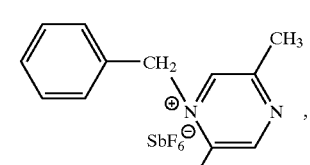

(Sb-G type)

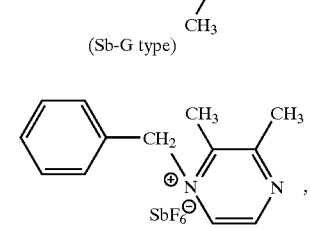

(Sb-H type)

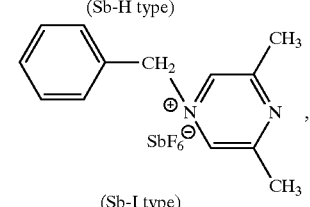

(Sb-I type)

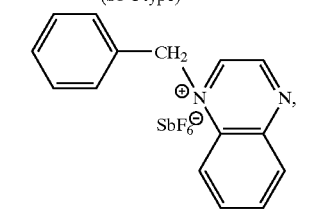

(Sb-J type)

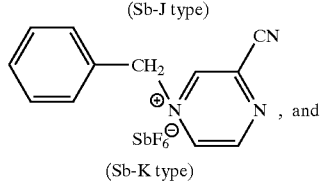

(Sb-K type)

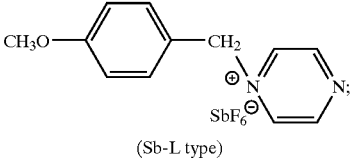

(Sb-L type)

wherein the method comprises:
providing a mold made of a transparent material that allows transmission of light, wherein the mold contains the epoxy resin curing system, and wherein the epoxy resin curing system has front and back areas;
maintaining a distance between a lamp and the epoxy resin curing system, wherein the distance is between 10 cm and 15 cm;
and irradiating light onto both the front and back areas of the epoxy resin curing system, thereby giving a cured product having a thickness of 3 mm or more.

11. A method for producing an epoxy resin cured product by curing with light an epoxy resin curing system; wherein the epoxy resin curing system comprises an epoxy resin and a curing agent; and wherein the curing agent is selected from the group consisting of:

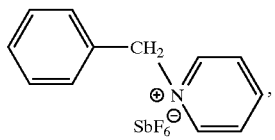
(Sb-A type)

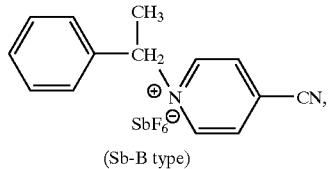
(Sb-B type)

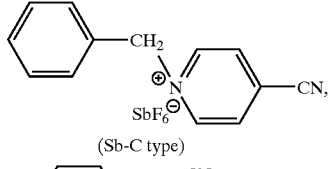
(Sb-C type)

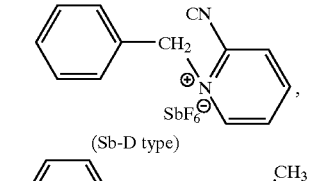
(Sb-D type)

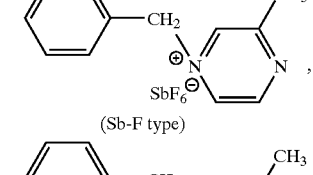
(Sb-F type)

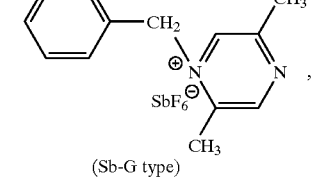
(Sb-G type)

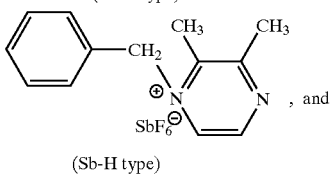
, and
(Sb-H type)

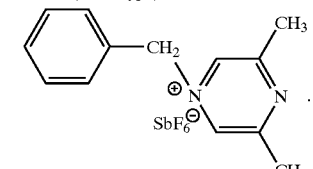
(Sb-I type)

12. The method as claimed in claim 11, wherein the light is at least one selected from the group consisting of ultraviolet, a high frequency wave, microwave, electron beam, X-ray and γ-ray.

13. The method as claimed in claim 11, wherein the method comprises providing a mold made of a transparent material that allows transmission of light, wherein the mold contains the epoxy resin curing system; and
irradiating the epoxy resin curing system with the light, thereby producing the epoxy resin cured product.

14. A method for producing an epoxy resin cured product by curing with light an epoxy resin curing system; wherein the light is at least one selected from the group consisting of a high frequency wave, electron beam, X-ray and γ-ray; wherein the epoxy resin curing system comprises an epoxy resin and a curing agent; and wherein the curing agent is selected from the group consisting of:

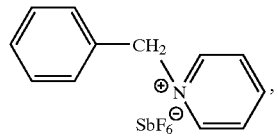
(Sb-A type)

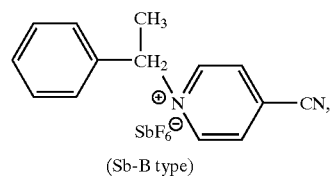
(Sb-B type)

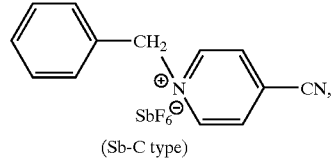
(Sb-C type)

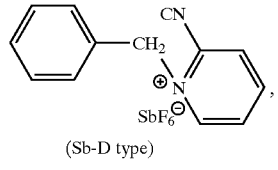
(Sb-D type)

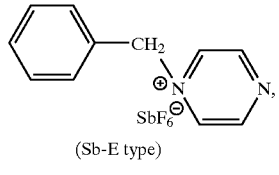
(Sb-E type)

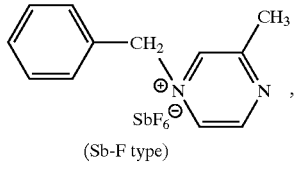
(Sb-F type)

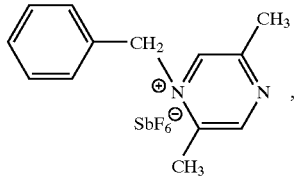
(Sb-G type)

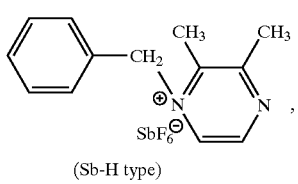
(Sb-H type)

-continued

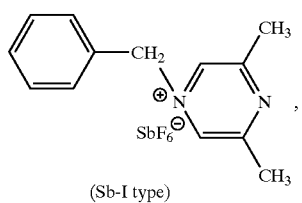
(Sb-I type)

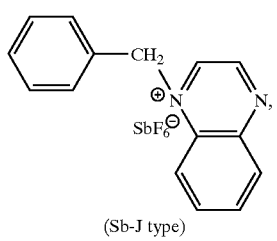
(Sb-J type)

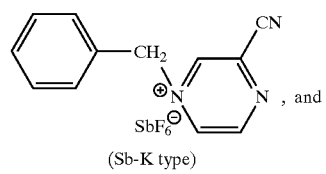
(Sb-K type)

, and

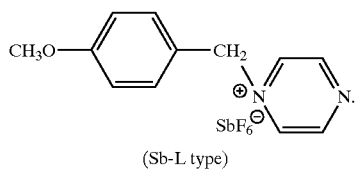
(Sb-L type)

15. The method as claimed in claim 14, wherein the high frequency wave has a wavelength between 10 nm and 400 nm.

16. A method for producing an epoxy resin cured product, the method comprising curing with an ultra-sonic wave an epoxy resin curing system; wherein the epoxy resin curing system comprises an epoxy resin and a curing agent; and wherein the curing agent is selected from the group consisting of:

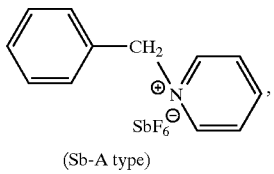
(Sb-A type)

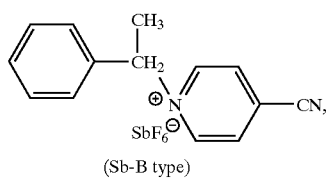
(Sb-B type)

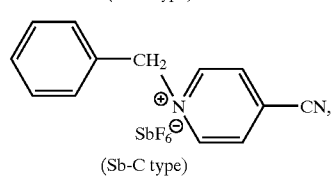
(Sb-C type)

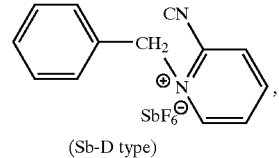
(Sb-D type)

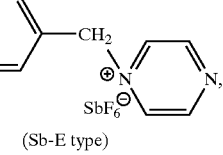
(Sb-E type)

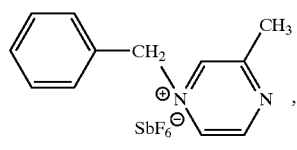
(Sb-F type)

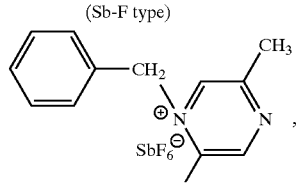
(Sb-G type)

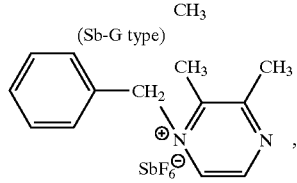
(Sb-H type)

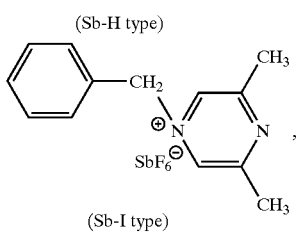
(Sb-I type)

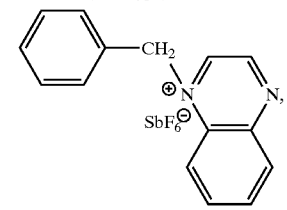
(Sb-J type)

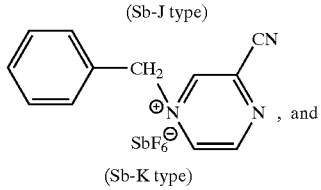
, and
(Sb-K type)

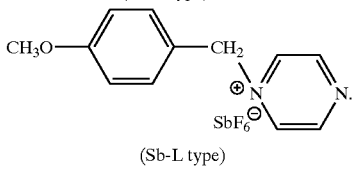
(Sb-L type)

17. A method for producing an epoxy resin cured product by heat curing an epoxy resin curing system, wherein the epoxy resin curing system has a temperature; wherein the method comprises increasing the temperature of the epoxy resin curing system from 120° C. to 180° C. at a rate of 3 to 7° C./minute; wherein the epoxy resin curing system comprises an epoxy resin and a curing agent; and wherein the curing agent is selected from the group consisting of:

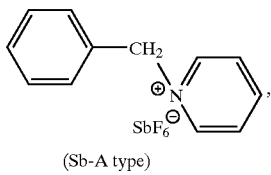
(Sb-A type)

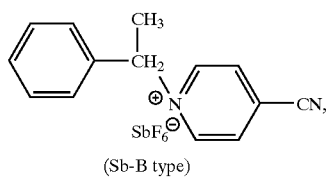
(Sb-B type)

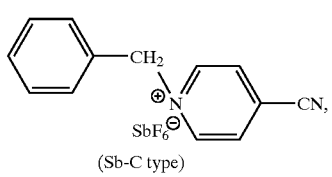
(Sb-C type)

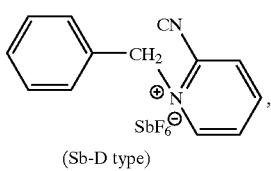
(Sb-D type)

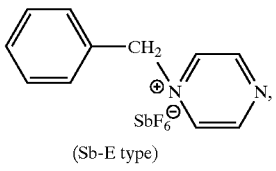
(Sb-E type)

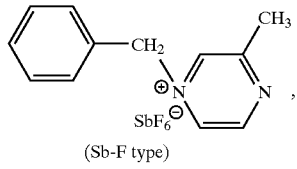
(Sb-F type)

-continued

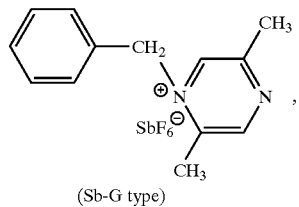
(Sb-G type)

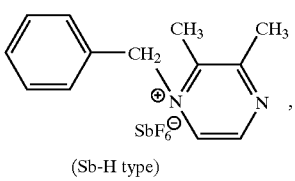
(Sb-H type)

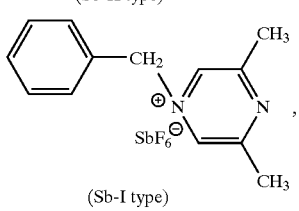
(Sb-I type)

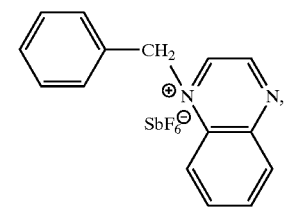
(Sb-J type)

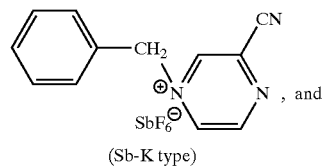
(Sb-K type)

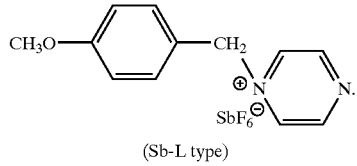
(Sb-L type)

* * * * *